(12) United States Patent
Reynolds

(10) Patent No.: US 11,396,959 B2
(45) Date of Patent: Jul. 26, 2022

(54) SUSPENSION ASSEMBLY

(71) Applicant: GRIPPLE LIMITED, Sheffield (GB)

(72) Inventor: Thomas William Reynolds, Sheffield (GB)

(73) Assignee: GRIPPLE LIMITED

( * ) Notice: Subject to any disclaimer, the term of this patent is extended or adjusted under 35 U.S.C. 154(b) by 0 days.

(21) Appl. No.: 17/257,985

(22) PCT Filed: Jul. 19, 2019

(86) PCT No.: PCT/GB2019/000103
§ 371 (c)(1),
(2) Date: Jan. 5, 2021

(87) PCT Pub. No.: WO2020/021218
PCT Pub. Date: Jan. 30, 2020

(65) Prior Publication Data
US 2021/0270391 A1 Sep. 2, 2021

(30) Foreign Application Priority Data

Jul. 24, 2018 (GB) ...................................... 1812081
Jul. 18, 2019 (GB) ...................................... 1910261

(51) Int. Cl.
*F16L 3/00* (2006.01)
*F16L 3/223* (2006.01)
*F16L 3/23* (2006.01)
*H02G 3/00* (2006.01)

(52) U.S. Cl.
CPC ................ *F16L 3/223* (2013.01); *F16L 3/23* (2013.01); *H02G 3/263* (2013.01)

(58) Field of Classification Search
None
See application file for complete search history.

(56) References Cited

U.S. PATENT DOCUMENTS

| 2,632,217 | A | * | 3/1953 | Laurenceh | ............ | F16L 3/2334 |
| | | | | | | 24/16 PB |
| 4,709,888 | A | | 12/1987 | Cubit et al. | | |
| 4,805,856 | A | * | 2/1989 | Nicoli | ................... | F16L 3/2334 |
| | | | | | | 248/74.3 |
| 5,042,114 | A | * | 8/1991 | Parrish | .................... | F16L 3/233 |
| | | | | | | 24/16 PB |
| 5,791,607 | A | | 8/1998 | Thibault et al. | | |
| 2012/0074268 | A1 | | 3/2012 | Mcmath et al. | | |
| 2012/0124783 | A1 | * | 5/2012 | DeBerry | ................ | B65D 63/08 |
| | | | | | | 24/20 R |
| 2019/0376544 | A1 | * | 12/2019 | Davis | ........................ | F16L 3/22 |

FOREIGN PATENT DOCUMENTS

| FR | 2540946 A3 | 8/1984 |
| GB | 2558759 A | 7/2018 |
| WO | 2018100329 A1 | 6/2018 |

* cited by examiner

Primary Examiner — Steven M Marsh
(74) Attorney, Agent, or Firm — James R. Foley; Clark Hill PLC

(57) ABSTRACT

A suspension assembly (10) comprises a support member (12), an elongate suspension member (14), and a securing arrangement. The support member (12) defines a central aperture (20) for receiving the suspension member (14) therethrough. The suspension member (14) defines a latching opening. The securing arrangement includes a latch member receivable through the latching opening in the suspension member (14) to secure the support member (12) to the suspension member (14).

19 Claims, 22 Drawing Sheets

SUSPENSION ASSEMBLY

This invention relates to suspension assemblies. More particularly, but not exclusively, this invention relates to suspension assemblies for suspending articles, such as pipes and cable trays, from overhead.

It is known to suspend cable conduits and trays, as well as pipes, from roofs or ceilings by mean of brackets attached to threaded rods. The rods have to be cut to length and screwed into attachments in the roof or ceiling. The threaded rods are inserted through openings in the brackets and attached to the brackets using nuts screwed onto the rods. All of these steps, particularly the cutting of the rods, can be very time consuming. Similarly, other suspension systems exist that provide the disadvantage that the installation of the pipes and trays requires them to be fed through the systems. Again, this can be time consuming.

According to one aspect of this invention, there is provided a suspension assembly comprising a support member, an elongate suspension member, and a securing arrangement, the support member defining an aperture for receiving the suspension member therethrough, and the suspension member defining a latching aperture, wherein the securing arrangement includes a latch member receivable through the latching aperture in the suspension member to secure the support member to the suspension member.

The aperture defined in the support may be a central aperture defined centrally in the support member. Alternatively, the aperture defined in the support member may be defined closer to one end of the support member.

The suspension member may extend through the centre of gravity of the support member. The aperture defined by the support member may be defined in an upper portion of the support member. The upper portion may be elongate.

The support member may be elongate. The aperture defined by the support member may extend through the centre of gravity of the upper portion. The suspension assembly may comprise no more than one suspension member. The aperture defined by the support member may be a slot.

The suspension assembly may comprise a plurality of the support members arranged one above the other along the length of the suspension member. The suspension assembly may include a plurality of the securing arrangements, each securing arrangement being provided on a respective one of the support members. Each securing arrangement may include a respective latch member.

The, or each, support member may define no more than one aperture for receiving the suspension member therethrough.

The, or each, support member may have a side portion extending from the upper portion. The side portion may extend downwardly from the upper portion. The side portion may be elongate, and may extend along the upper portion.

The, or each, support member may comprise opposite side portions extending from the upper portion. The side portions may extend downwardly from the upper portion. Each of the side portions may be elongate, and may extend along the upper portion. The support member may have a U shaped end profile.

In use, the, or each, support member may support an article, which may be an elongate article. The elongate article may be, for example, a pipe or a cable tray. The article may extend from the suspension assembly to an adjacent suspension assembly.

In use, the, or each, support member may support two of said articles, each article being arranged on a respective opposite end region of the support member. The suspension member may extend from the support member between the articles.

The aperture defined in the suspension member may be a slot. The suspension member may define a plurality of the apertures spaced from one another along the suspension member.

The, or each, latch member may be received through a selected one, or respective one, of the apertures in the suspension member. Each of the apertures defined in the suspension member may be a slot.

The suspension member may comprise an elongate substantially flat strip. The substantially flat strip may comprise a strap.

The, or each, securing arrangement may be provided on the, or a respective, support member. The, or each, securing arrangement may be attached to the, or the respective, support member centrally thereof. The securing arrangement may comprise a latch arrangement. The latch member may be movable between securing and non-securing positions.

In the securing position of the latch member, the suspension member may be secured to the support member. In said securing position, the latch member may engage the suspension member. In the non-securing position, the support member may be released from the suspension member.

The latch member may comprise a carrying portion. The latch member may comprise an insertion portion on the carrying portion. The insertion portion may be insertable through the aperture in the suspension member to secure the suspension member to the support member. In said securing position, the insertion portion may be received by the aperture in the suspension member.

In the non-securing position, the suspension member may be movable relative to the support member. In the non-securing position, the latch member may be disengaged from the suspension member. The latch member may be slidably movable between the securing and non-securing positions.

The securing arrangement may comprise urging means for urging the latch member to the securing position. The urging means may be resilient.

The urging means may comprise an urging member to urge the latch member to the securing position. The urging member may engage the latch member. The urging member may comprise a spring. The spring may be a compression spring.

The urging means may comprise two of the aforesaid urging members. The latch member may further include a release portion to allow a user to move the latch member to the non-securing position.

The, or each, support member may include an access formation to allow access for the user to the release member. The access formation may be a recess defined in one of the side portions.

The release portion may be arranged to be pressed by the user to move the latch member to the non-securing position. The release portion may extend across the access formation to allow the release member to be pressed by the user to move the latch member to the non-securing position.

The release portion may be attached to the carrying portion. The release portion may extend transverse to the carrying portion.

The carrying portion may define an opening into which the insertion portion may extend. When the latch member is in the non-securing position, the opening may be aligned with the central aperture defined by the support member.

The latch member may have a guide formation to guide movement of the latch member. The guide formation may be an elongate guide slot defined by the carrying portion. The guide formation may extend into the insertion portion. The guide formation may receive a corresponding guide member. The guide member may be provided on the holding component.

The guide member may comprise a guide projection, which may be received in the guide formation. The guide projection may comprise a snap hook.

The snap hook may be received in the guide slot. The guide projection may be provided on the holding component.

The latch member may include a projecting portion on the carrying portion. The projecting portion may project from the carrying portion opposite the insertion portion. The guide formation may extend from the carrying portion into the projecting portion.

The, or each, securing arrangement may include a mounting assembly for mounting the securing arrangement on the support member. The, or each, mounting assembly may comprise a holding component for holding the latch member.

The holding component may comprise a gripping formation for gripping the suspension member. The gripping formation may define a through passage aligned with the central aperture in the support member.

The gripping formation may include ribs to engage the suspension member. The ribs may be crushed by the suspension member when the suspension member is received in said central aperture.

The, or each, mounting assembly may further include a fastener to fasten the securing arrangement to the support member. The fastener may be elongate and may extend through the holding component and the support member to fasten the holding component to the support member. The fastener may be a metallic fixing, such as a bolt or a rivet.

The holding component may further include a fastening formation through which the fastener can extend, thereby locating the holding component on the support. The fastening formation may allow the fastener to fasten the holding component to the support.

The, or each, mounting assembly may include two of the fasteners and two of the fastening formations.

The, or each, securing arrangement may further include a cover member for covering the holding component. The cover member may include a locating formation for locating the cover member over the holding component.

The cover member may include two of the locating formations. The, or each, fastener may extend through the, or each, locating formation to fasten the cover member over the holding component.

The, or each, locating formation may define a locating aperture to receive the, or a respective, fastener therethrough. The, or each, locating formation may define two of the locating apertures to receive the, or a respective, fastener therethrough.

The cover member may comprise a covering portion. The covering portion may be a lower portion of the cover member. The locating formations may comprise a rear locating formation. The locating formations may comprise a front locating formation. The locating formations may comprise a pair of front locating formations.

The locating formations may extend upwardly from the covering portion. The rear locating formation may extend across the rear of the lower portion. The front locating formation may extend upwardly at the front corners of the covering portion.

The cover member may define a further aperture to receive the suspension member therethrough. The cover member may have front and rear locating apertures defined in the front and rear locating formations.

The suspension member may be formed of a metallic material. The support member may be formed of a metallic material. The cover member may be formed of a metallic material. The latch member may be formed of a metallic material. The metallic material may be a steel, for example mild steel, or aluminium.

The aperture defined by the support member may be a tight fit around the suspension member. The further aperture in the cover member may be a tight fit around the suspension member.

Thus, in the embodiment described herein, there is metal on metal contact between the suspension member the support member. There may also be metal on metal contact between the suspension member and the cover member. There may also be metal on metal contact between the suspension member and the latch member.

The metal on metal contact between the suspension member, the support member and at least the cover member has the effect of providing support to cantilever loads on the support member in the event of failure of the holding component, for example in the case of a fire.

The suspension assembly may comprise a locking arrangement to lock the latch member in the securing position. The locking arrangement may include a locking member. The locking member may be movable between locked and unlocked positions.

The latch member may comprise a co-operating portion, which may be adjacent the release portion. The co-operating portion may engage the locking member when the latch member is in the securing position and the locking member is in the locked position. The co-operating portion may comprise a lug.

The locking member may be arranged so that, when the latch member is in the non-securing position, the locking member engages the co-operating portion if the locking member is moved towards the locked position. This has the effect of preventing the locking member from being moved fully to the locked position, and provides the advantage in the embodiments described herein that it prevents the latch member from being locked in the non-securing position.

The locking member may have a plurality of side members. The locking member may have four of the side members. The locking member may have a transverse portion extending between the side members. The transverse portion may be substantially flat.

Two opposite side members may each have a recessed middle portion. The locking member may have a pair of opposed positioning members, which may extend between the opposite recessed middle portions.

A respective detent member may extend from each of the recessed portions. When the locking member is mounted on the support member, the positioning members may be received in a hole defined in the holding component.

The positioning members may locate the locking member over the aperture. The detent members may hook over opposite edges of the hole.

The support member may be elongate. The aperture defined by the support member may be elongate. The support member may have a longitudinal main axis, and the aperture defined by the support member may extend parallel to said longitudinal main axis.

The suspension member may be deformable to a deformed condition in which a lower region of the suspension member extends transverse to an upper region of the suspension member.

The suspension member may be formed of a malleable material to allow it to be deformed to the deformed condition. The suspension member may be formed of a metallic material to allow it to be deformed to the deformed condition.

The holding component may comprise a constraining formation to constrain movement of the latch member. The constraining formation may be a constraining slot defined by the holding component. The carrying portion may extend through holding component.

The holding component may further include constraining ribs to engage the carrying portion. The constraining ribs and the constraining slot may ensure that the insertion portion runs accurately through the holding component.

At least one embodiment of the invention will now be described by way of example only, with reference to the accompanying drawings, in which.

The drawings show a suspension assembly 10 comprising an elongate support member 12, an elongate suspension member 14, and a securing arrangement 15.

The suspension assembly 10 is used as part of a suspension system for suspending articles, such as pipes or cable trays, from the roof or ceiling of a building, or from any other suitable region of a building's fabric above the area of the building along which the articles are to extend.

Figure 1:
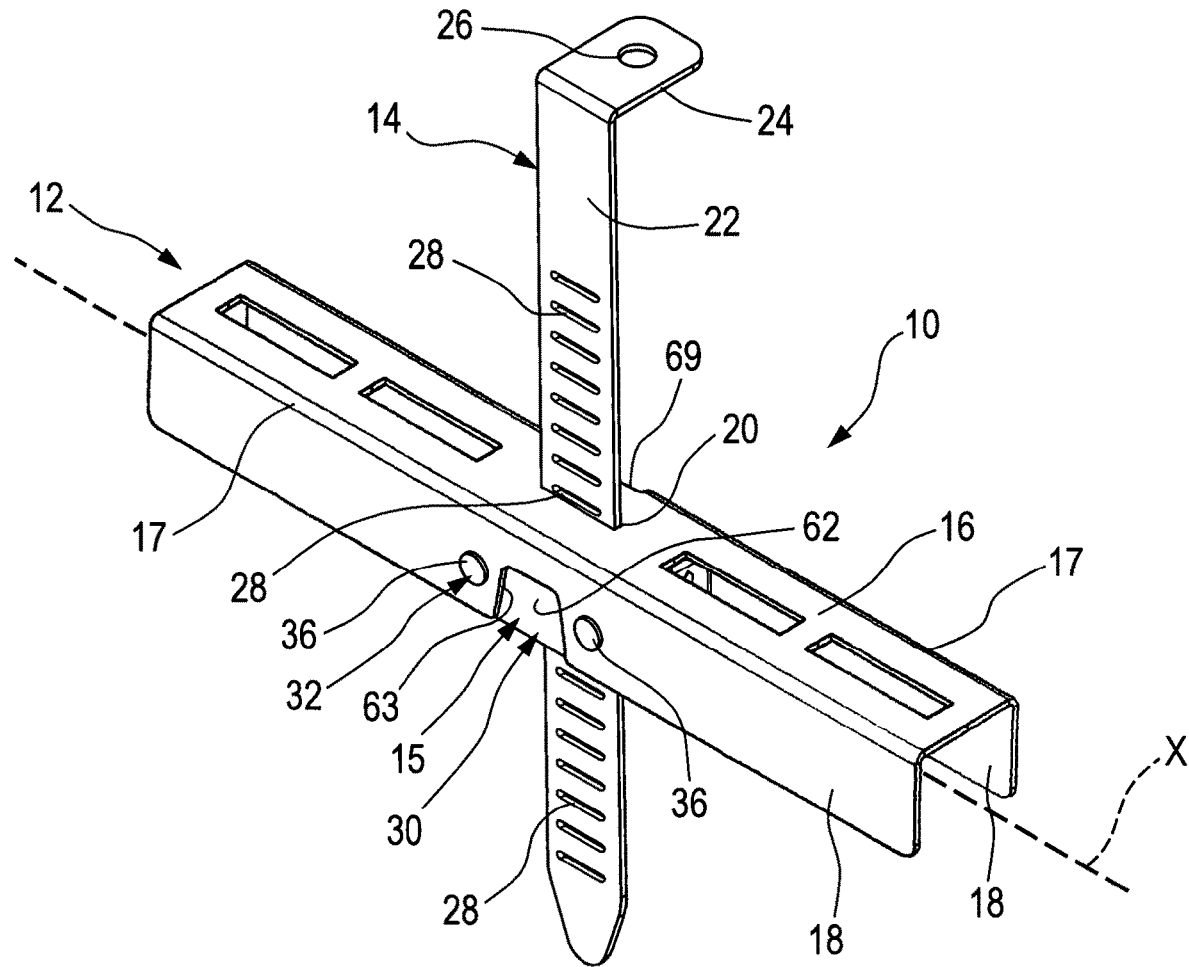
FIG. 1 is a front perspective view from above of a suspension assembly.
Figure 2:
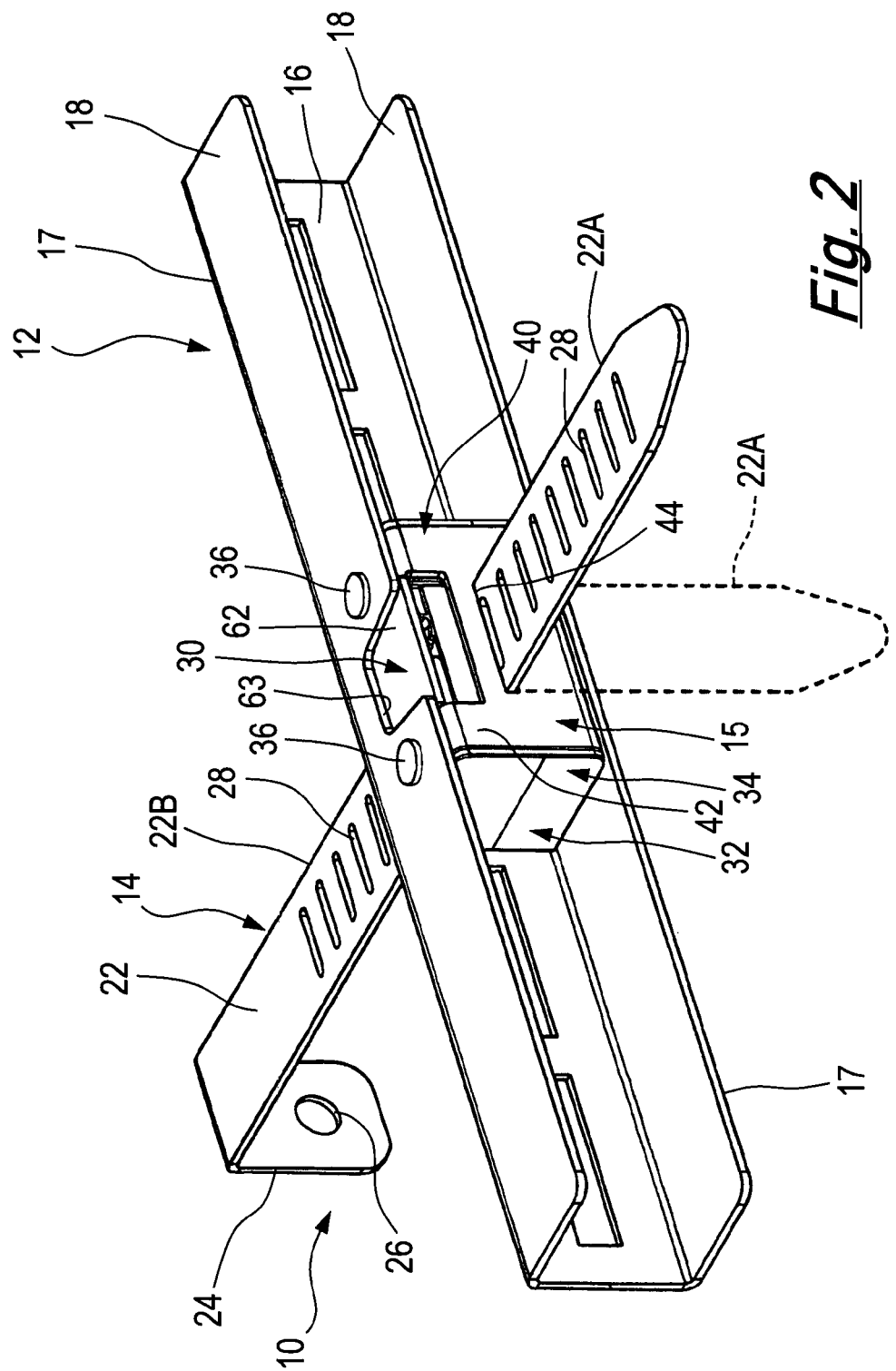
FIG. 2 is a front perspective view from below of the suspension assembly.

The support member 12 comprises an elongate substantially flat upper portion 16 and opposite side portions 18 extending downwardly from the upper portion 16. The support member 12 has a substantially U shaped end profile, as shown in FIGS. 1 and 2.

The support member 12 defines an aperture in the form of an elongate first slot 20 in the upper portion 16. The first slot 20 is a central aperture in the upper portion 16 of the support member 12. The first slot 20 extends through the centre of gravity of the upper portion 16. Two end regions 17 of the support member 12 extend in opposite directions from the first slot 20.

The first slot 20 can receive the suspension member 14 therethrough. The support member 12 has a longitudinal main axis X. The first slot 20 extends parallel to said longitudinal main axis X.

The suspension member 14 has an elongate main part 22 and an attaching part 24 extending transverse to the main part 22. In the embodiment shown, the attaching part 24 extends at a right angle to the main part 22.

The attaching part 24 defines a fastening aperture 26 through which a fastener, such as a screw, can extend to attach the suspension member 14 to the roof, ceiling or other suitable region of the building's fabric.

The main part 22 of the suspension member 14 is deformable to a deformed condition (shown in broken lines in FIG. 2) in which a lower region 22A of the main part 22 extends transverse to an upper region 22B of the main part 22. The suspension member 14 is formed of a malleable metallic material to allow it to be deformed to the deformed condition. Alternatively, if desired, the lower region 22A can be cut off the remainder of the main part 22, and thereby removed.

Figure 22:
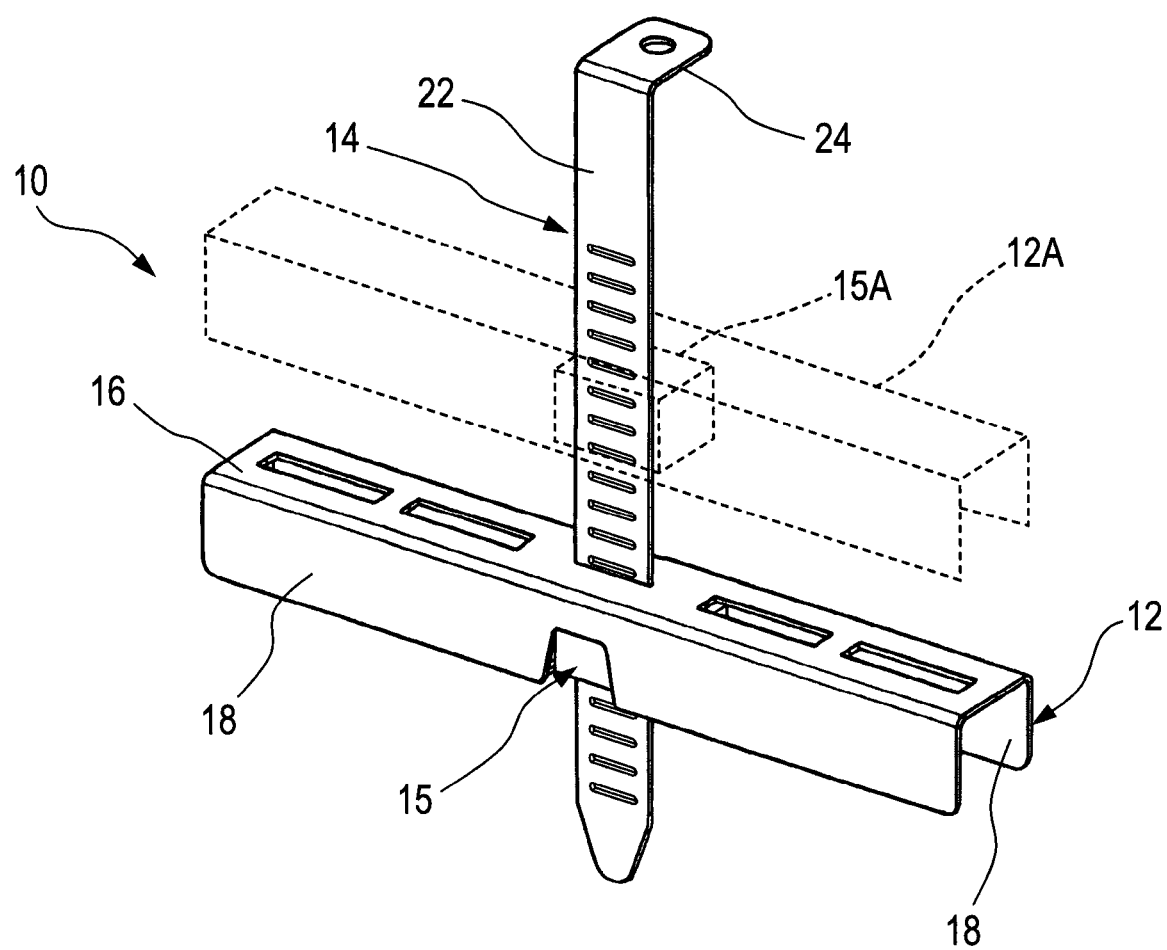
FIG. 22 shows a suspension assembly comprising a plurality of the support members and the suspension member.

Instead of bending or removing the lower region 22A, the suspension member 14 can be used to suspend a plurality of the support members 12, arranged one above the other along the length of the suspension member 14, as shown in FIG. 22.

In FIG. 22, a further support member 12A is disposed above the support member 12. The support member 12A has a respective securing arrangement 15A. The support member 12A and the securing arrangement 15A are shown schematically in FIG. 22, but they are identical to the support member 12 and the securing arrangement 15. The provision of a plurality of the support members 12A allows different articles to be supported on the respective support members 12 and 12A.

The suspension member 14 is in the form of a substantially flat strip, which may be a strap. The suspension member 14 defines a plurality of latching openings in the form of second slots 28. Each of the second slots 28 extends laterally across the suspension member 14.

When the main part 22 of the suspension member 14 is received through the first slot 20 (as explained below), the second slots 28 also extend parallel to the main axis X of the support member 12. The second slots 28 are spaced from one another longitudinally along the suspension member 14.

The securing arrangement 15 is mounted centrally on the support member 12, so that the first slot 20 is aligned with the securing arrangement 15. The securing arrangement 15 includes a latch member 30 to engage the suspension member 14 and secure the suspension member 14 to the support member 12. Operation of the latch member 30 is discussed below.

The securing arrangement 15 further includes a mounting assembly 32 for mounting the securing arrangement 15 on the support member 12. The mounting assembly 32 comprises a holding component 34 for holding the latch member 30.

The holding component 34 is formed of a plastics material, such as acrylonitrile butadiene styrene, or other suitable material.

The mounting assembly 32 further includes two elongate fasteners 36 to fasten the securing arrangement 15 to the support member 12. The fasteners 36 are in the form of metal fixings, such as bolts or rivets. The fasteners 36 fasten the cover member 40 to the support member 12. The fasteners 36 also fasten the holding component 34 to the support member 12.

The holding component 34 includes two fastening formations 38 through which the fasteners 36 extend to fasten the holding component 34 to the support member 12.

The securing arrangement 15 further includes a cover member 40 for covering the holding component 34. The cover member 40 comprises a lower portion 42 defining a third slot 44 through which the main part 22 of the suspension member 14 can extend.

The cover member 40 includes locating formations 46 for locating the cover member 40 over the holding component 34. The locating formations 46 include a rear locating formation 48 extending upwardly and across the rear of the lower portion 42.

The locating formations 46 also include a pair of front locating formations 50 extending upwardly at the front corners of the lower portion 42. The fasteners 36 extend through locating apertures 52 defined in the front and rear locating formations 48, 50 of the cover member 40 to fasten the cover member 40 across the holding component 34.

Figure 6:
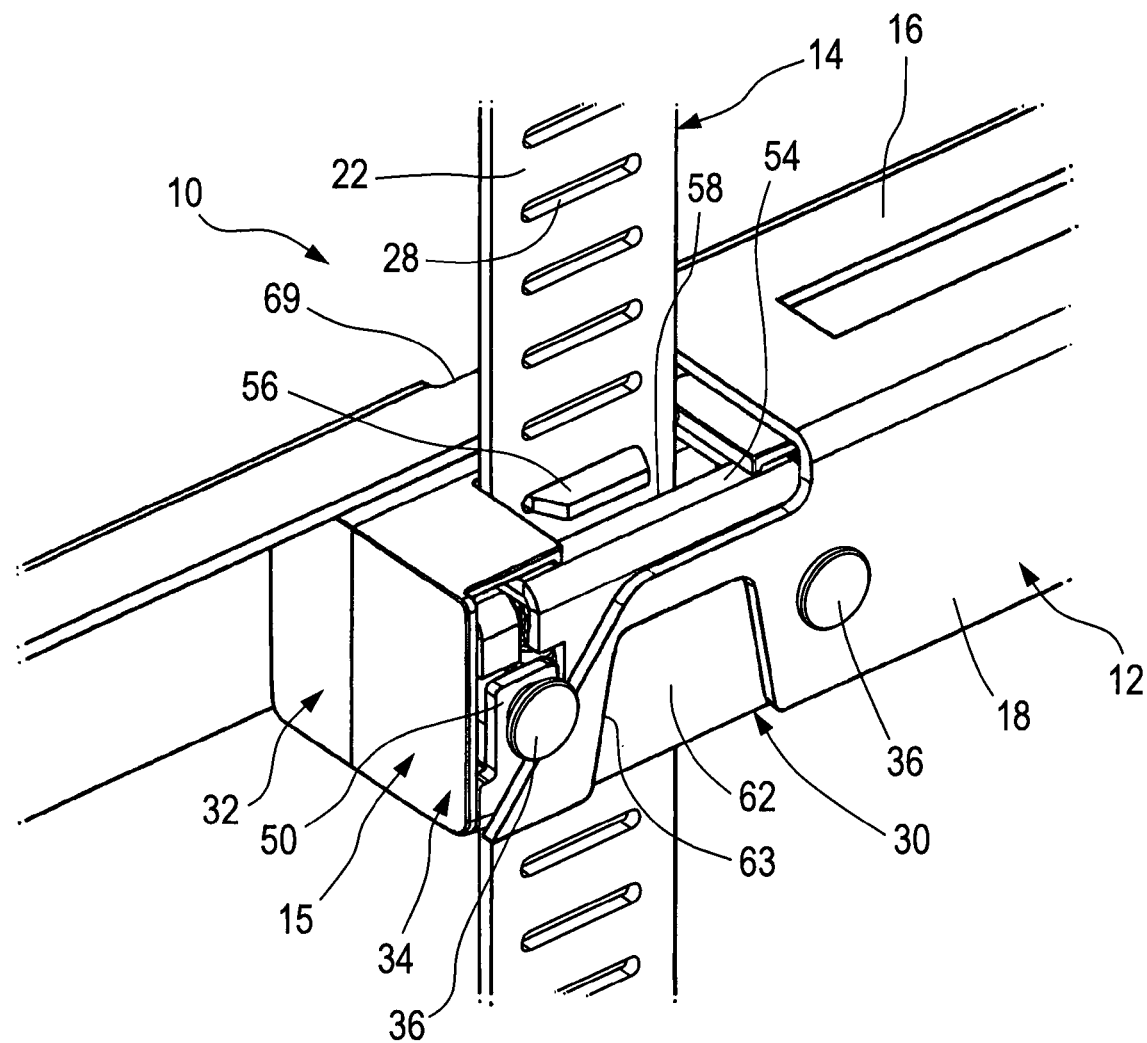
FIG. 6 is a close-up cut out front view of the securing arrangement, showing a latch member in a securing position.
Figure 7:
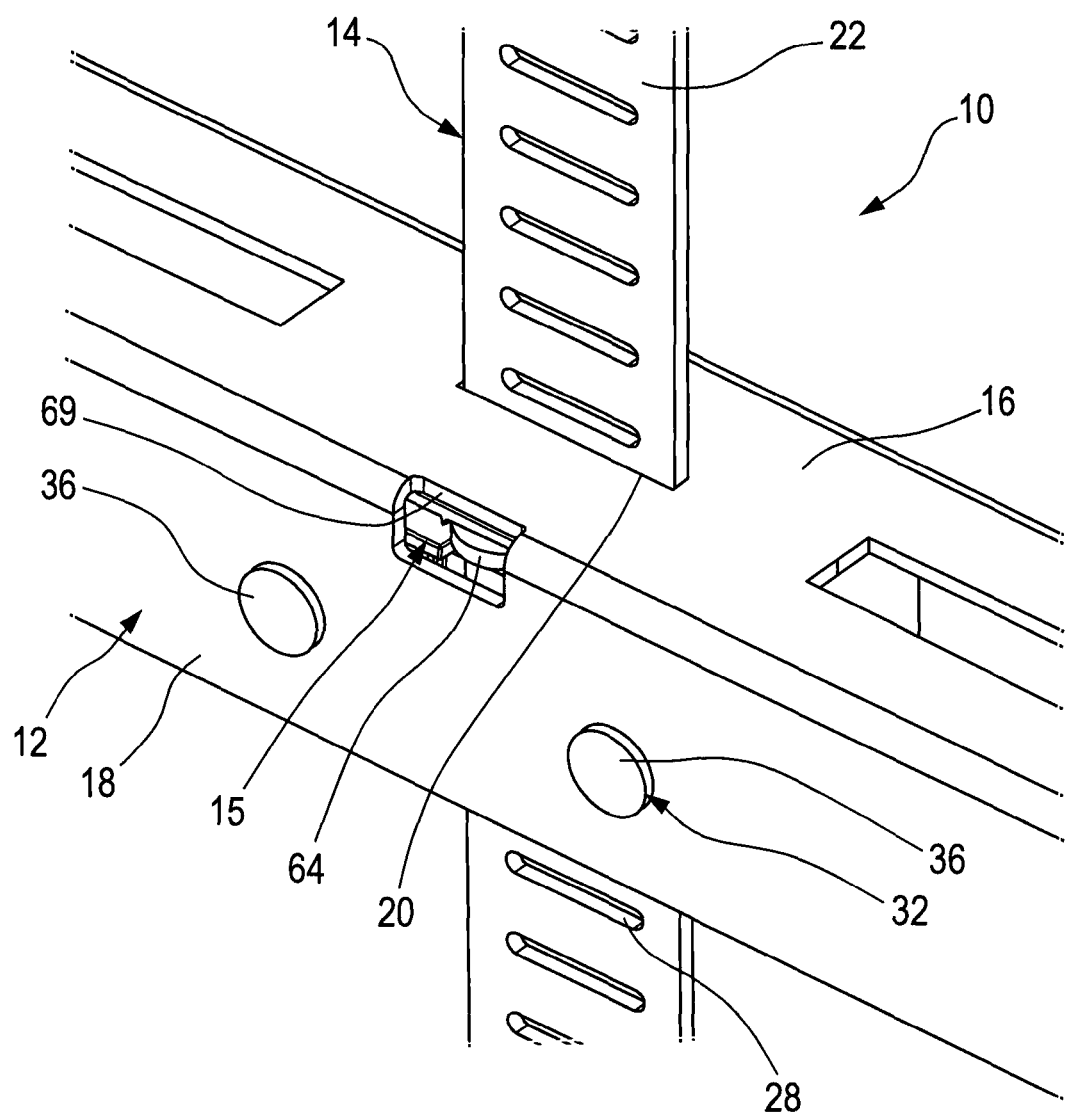
FIG. 7 is a rear view of the securing arrangement with the latch member in the securing position.
Figure 8:
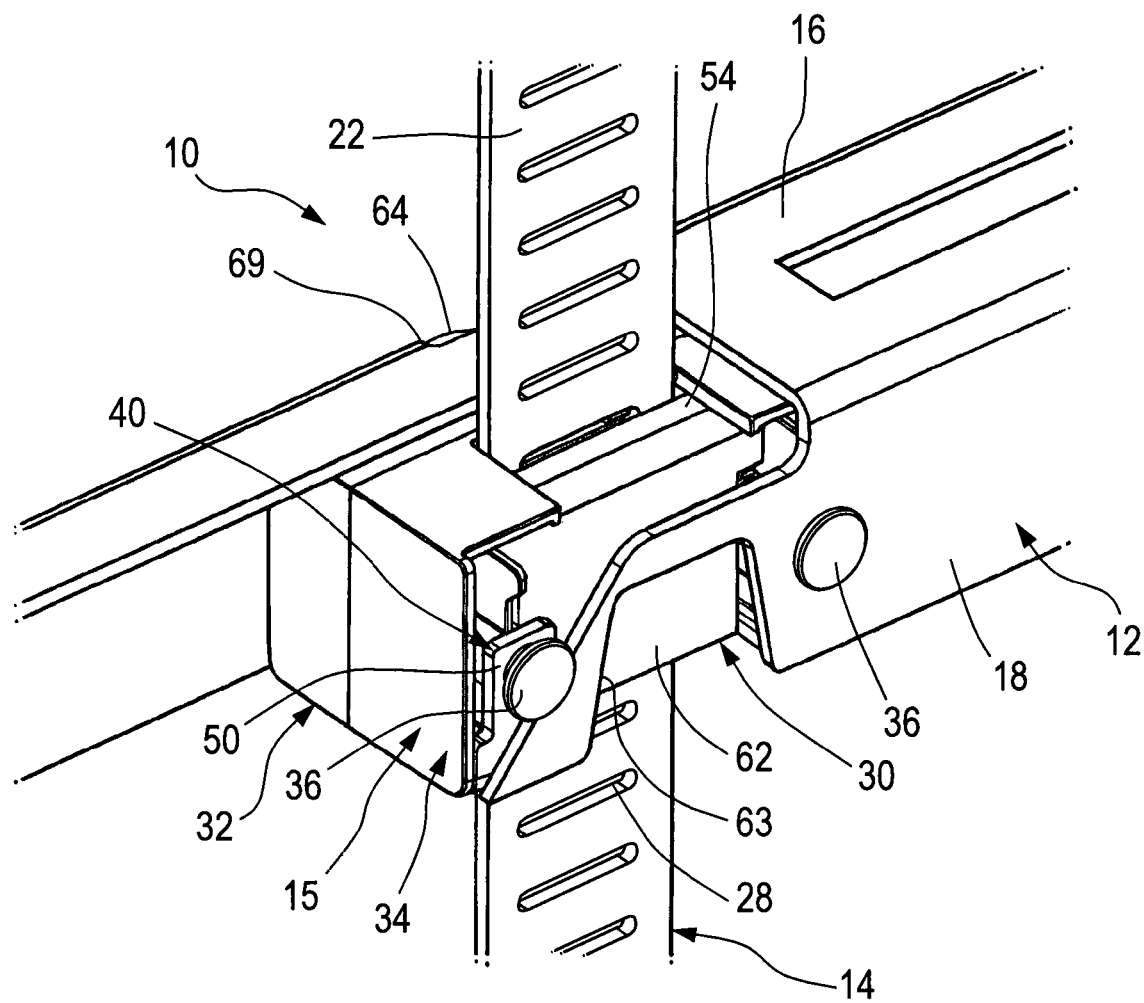
FIG. 8 is a close-up cut out front view of the securing arrangement, showing the latch member disposed in a non-securing position.
Figure 9:
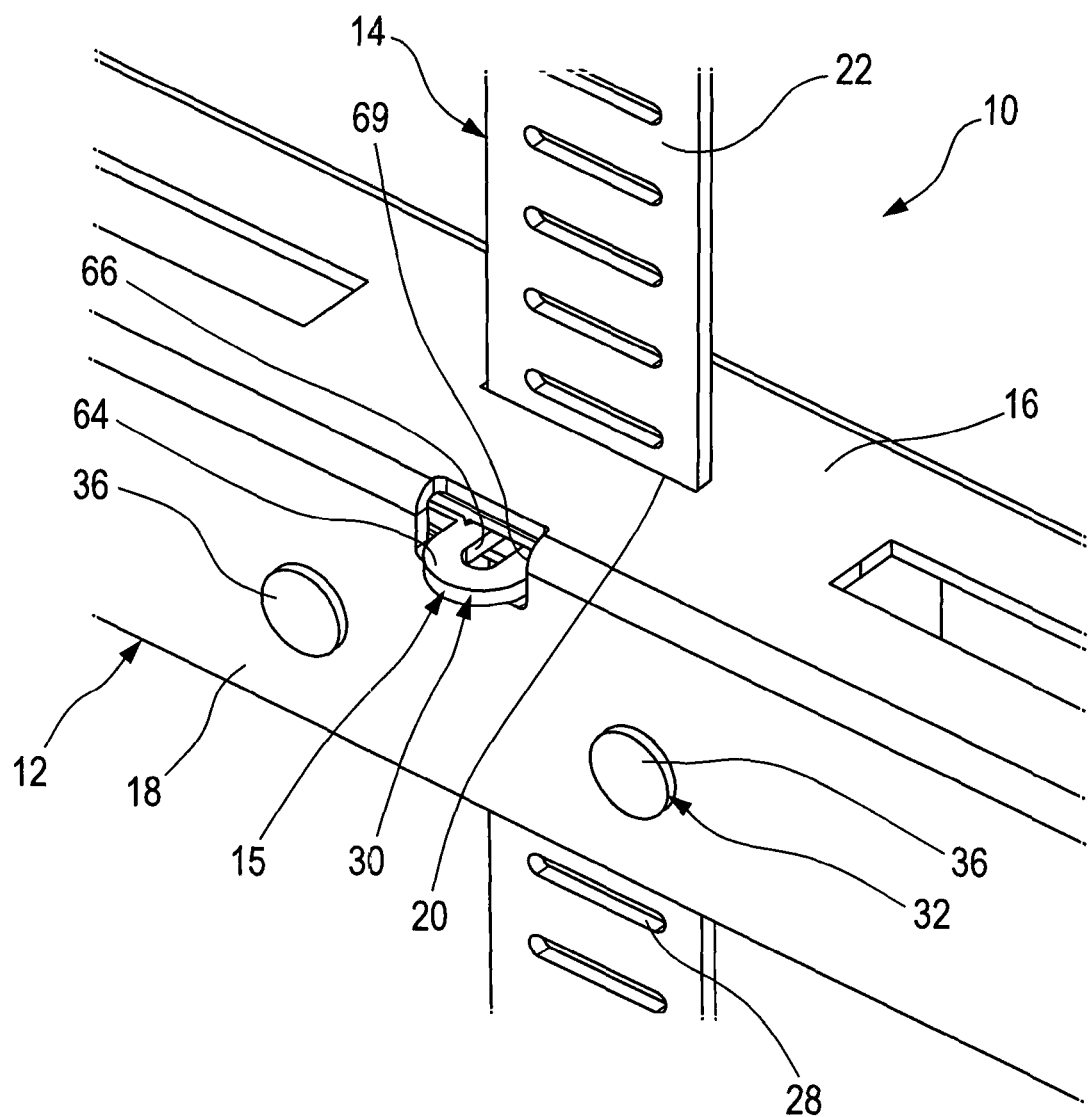
FIG. 9 is a rear view of the securing arrangement with the latch member disposed in the non-securing position.
Figure 10:
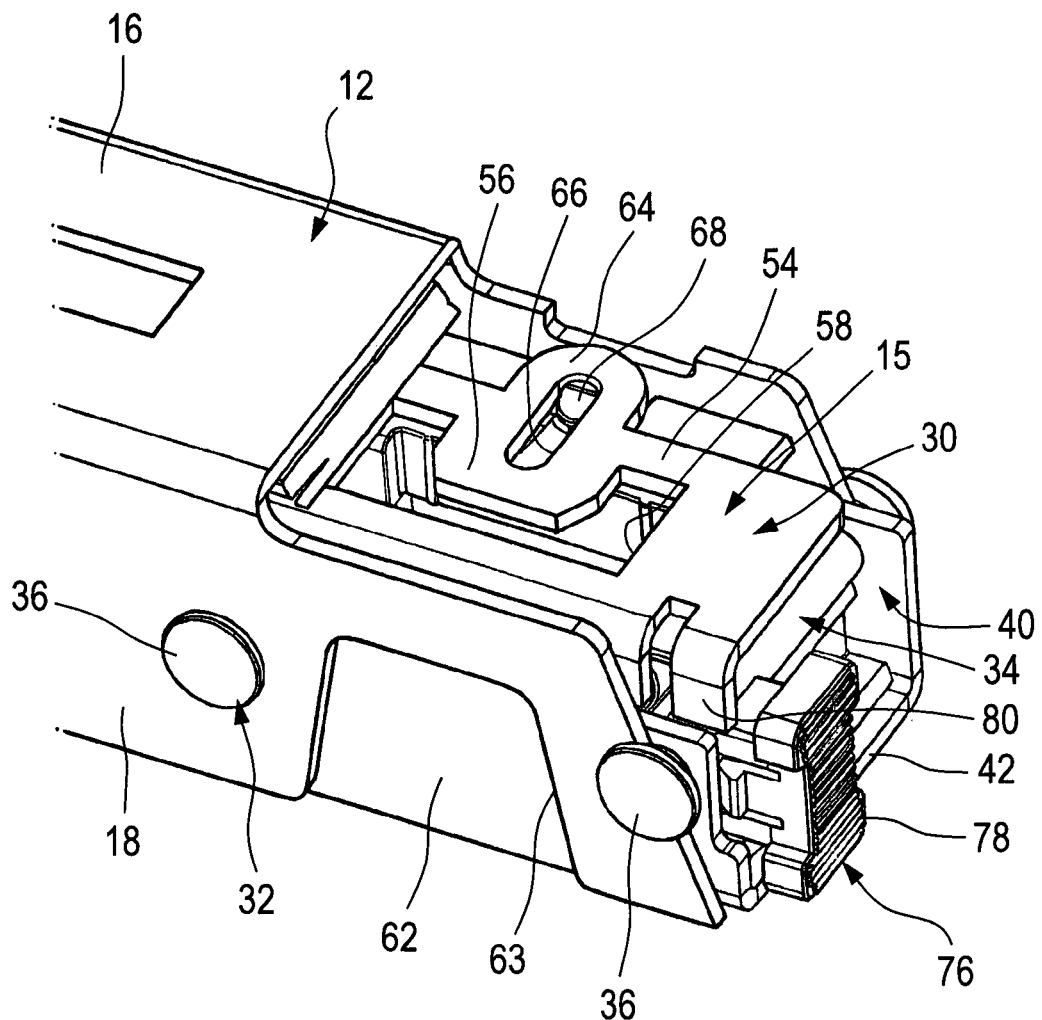
FIG. 10 is a close-up cut out front view of the support member and the securing arrangement showing the latch member disposed in the securing position.
Figure 11:
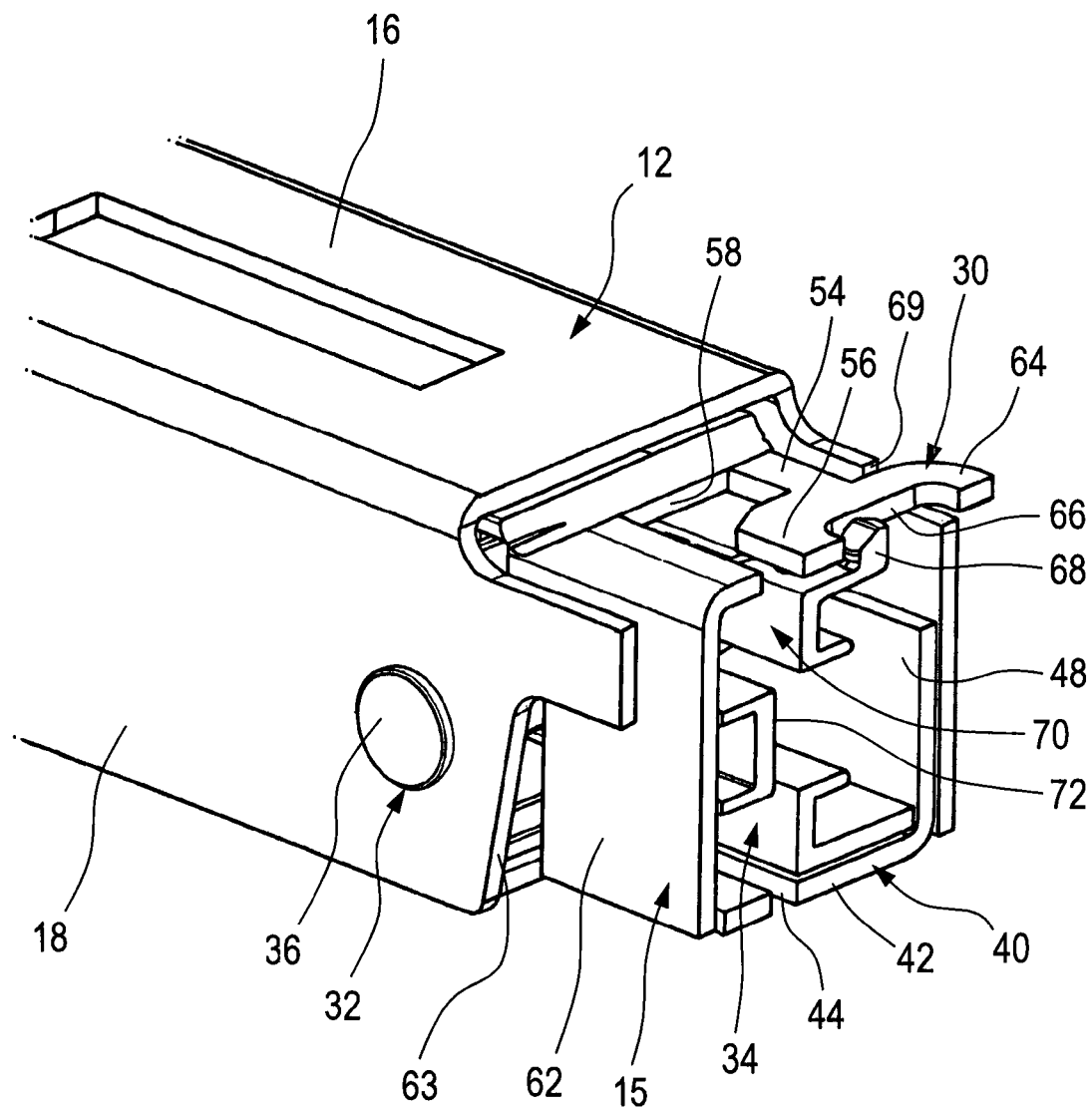
FIG. 11 is a close-up sectional cut out front view of the support member and the securing arrangement, showing the latch member disposed in the non-securing position.

The latch member 30 is slidably movable between a securing position, shown in FIGS. 6, 7 and 10, and a non-securing position, shown in FIGS. 8 and 9.

In the securing position, the latch member 30 engages the suspension member 14 by being received through a selected one of the second slots 28 in the main part 22 of the suspension member 14. When so received, the support member 12 is secured to the suspension member 14 by the latch member 30 in a desired position of the support member 12 relative to the suspension member 14.

The support member 12 is configured to support two of the aforesaid articles on respective opposite end regions of the support member 12. As a result, the articles are supported on the support member 12 either side of the suspension member 14.

The latch member 30 comprises a carrying portion 54 and an insertion portion 56 on the carrying portion 54. The carrying portion 54 defines a central opening 58 into which the insertion portion 56 extends.

When the latch member 30 is in the non-securing position, the central opening 58 is aligned with the first slot 20 defined by the support member 12, thereby allowing the suspension member 14 to be inserted through the first slot 20 and through the latch member 30.

The insertion portion 56 is insertable through the selected second slot 28 in the suspension member 14 to secure the suspension member 14 to the support member 12. Thus, in the securing position, the insertion portion 56 is received in the selected second slot 28 in the suspension member 14.

The securing arrangement 15 further includes two resilient urging members 60 for urging the latch member 30 to the securing position. In the embodiment described herein the urging members 60 are in the form of compression springs, but it will be appreciated that the urging members 60 could be other types of springs, such as leaf springs.

The latch member 30 further includes a release portion 62 to allow a user to move the latch member 30 to the non-securing position. The support member 12 includes an access formation 63 to allow access for the user to the release portion 62. The access formation 63 is an aperture defined in one of the side portions 18.

The release portion 62 constitutes a push button to allow the user to release the securing arrangement 15 from the suspension member 14, thereby allowing the support member 12 to be removed from the suspension member 14 or repositioned along the suspension member 14.

The release portion 62 extends across the access formation 63 to allow the release portion 62 to be pressed by the user to move the latch member 30 to the non-securing position 62. The release portion 62 is attached to the carrying portion 54, and extends transverse to the carrying portion 54.

The latch member 30 further includes a projecting portion 64 on the carrying portion 54. The projecting portion 64 extends rearwardly from the carrying portion 54 opposite the insertion portion 56. The carrying portion 54 defines a guide formation in the form of a guide slot 66. The guide slot 66 which extends from the insertion portion 56 across the projecting portion 64.

The guide slot 66 receives a corresponding guide member in the form of a guide projection 68. The guide projection 68 is in the form of a snap hook which is received in the guide slot 66. Thus, the latch member 30 snaps onto the guide projection 68 and is held in place by the guide projection.

The guide projection 68 is provided on the holding component 34. The guide projection 68 is held within the guide slot 66, whereby the guide slot 68 moves relative to the guide projection 68. Thus, movement of the latch member 30 between the securing and non-securing positions is guided by co-operation between the guide projection 68 and the guide slot 66.

The support member 12 defines a rear aperture 69 through which the projecting portion 64 projects when the latch member 30 is in the non-securing position.

The holding component 34 further includes a gripping formation 70 for gripping the suspension member 14. The gripping formation 70 defines a through passage 72 aligned with the first slot 20 defines in the support member 12.

The gripping formation 70 includes crush ribs 74 to engage the suspension member 14. The crush ribs 74 are formed of a plastics material and are crushed by the suspension member 14 when the suspension member 14 is received in the through passage 72 via the opening 58 in the carrying portion 54. Thus, the crush ribs 74 grip the suspension member 14.

The suspension member 14 is formed of a metal material, such as steel, for example mild steel, or aluminium. The support member 12 is formed of a metal material, such as steel, for example mild steel, or aluminium. The cover member 40 is also formed of a metal material, such as steel, for example mild steel, or aluminium.

The first slot 20 in the upper portion 16 of the support member 12 is a tight fit around the main part 22 of the suspension member 14. Similarly, the third slot 44 in the lower portion 42 of the cover member 40 is also a tight fit around the main part 22 of the suspension member 14.

As a result, there is metal on metal contact between the suspension member 14 and both of the support member 12 and the cover member 40. This has the effect of providing support to cantilever loads on the support member 12, i.e. a load on only one of the end regions 17, or unequal loads on both of the end regions 17, in the event of failure of the holding component 34, for example in the case of a fire.

Figure 3:
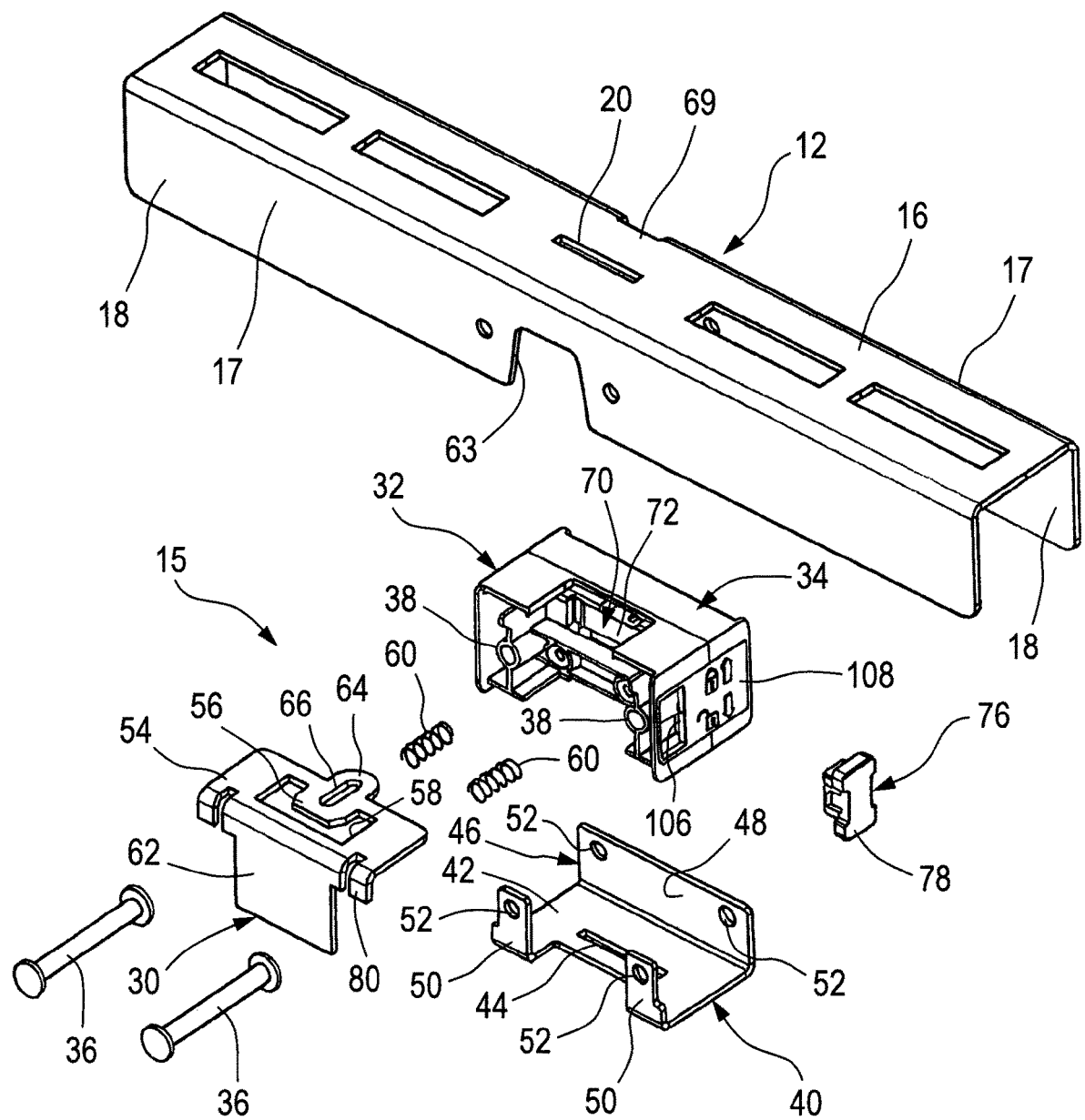
FIG. 3 is an exploded view of a support member and a securing arrangement, being part of the suspension assembly.
Figure 4:
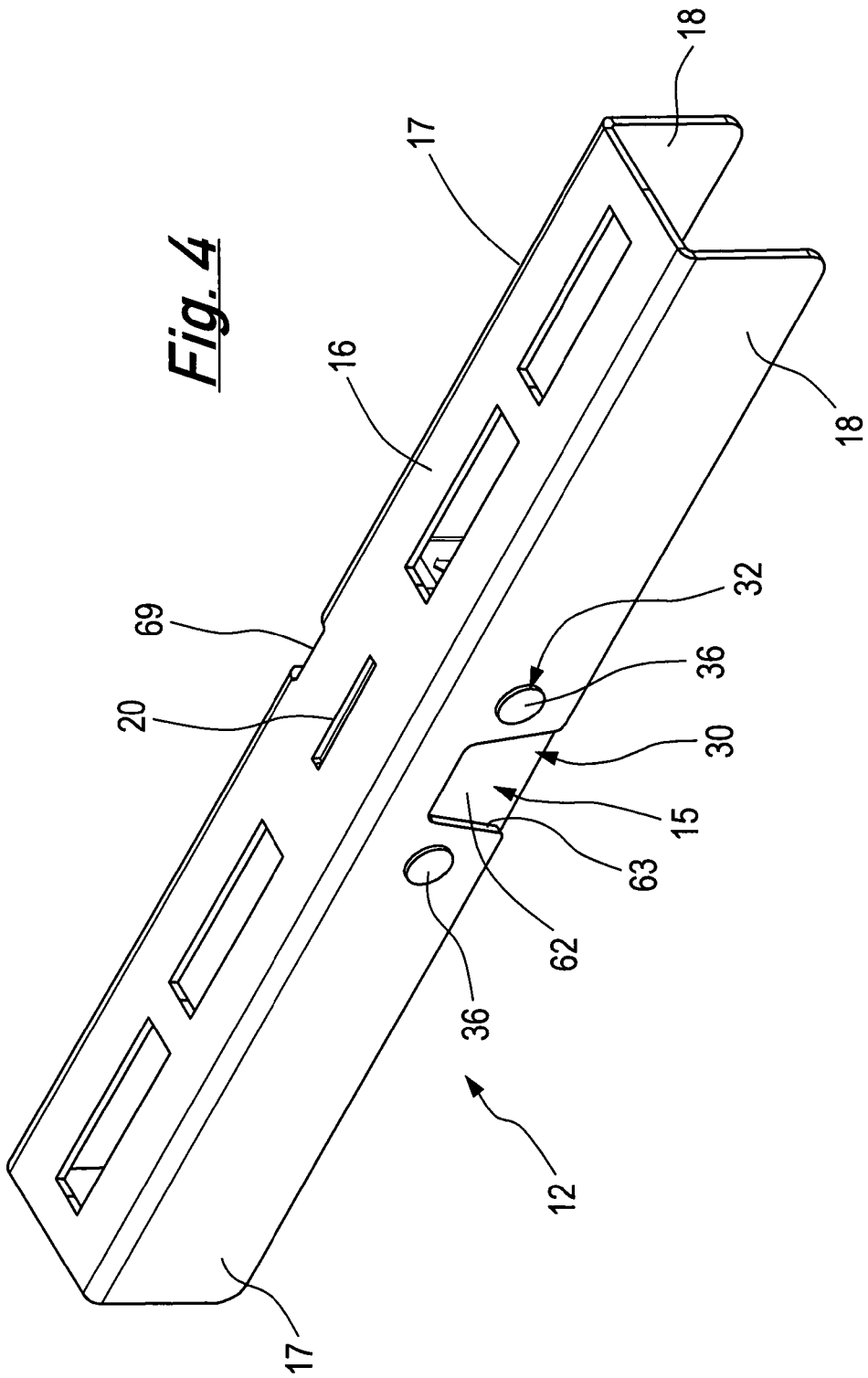
FIG. 4 is a front perspective view from above of the support member and the securing arrangement assembled.
Figure 5:
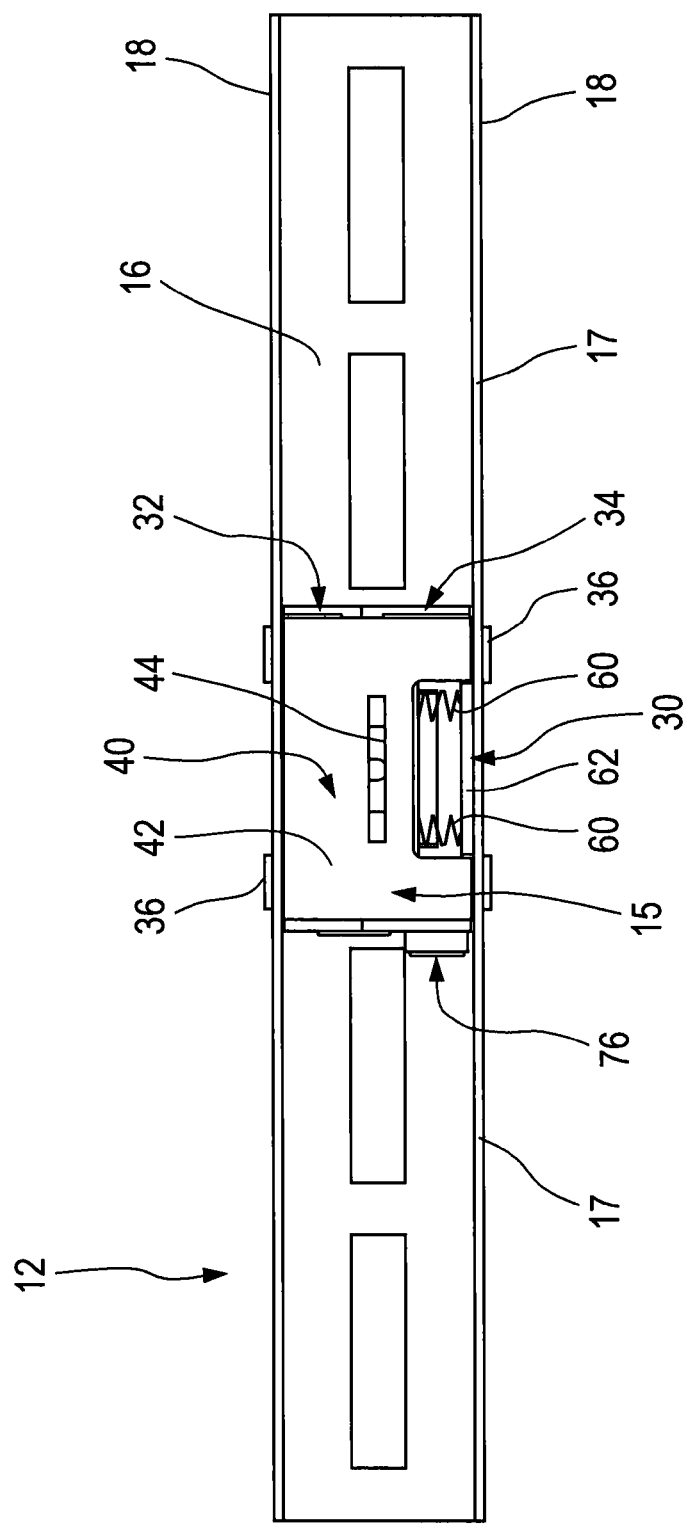
FIG. 5 is a view from below of the assembled support member and securing arrangement.

In the event of a fire, the plastic components may be destroyed. However, the suspension member 14, the support member 12, the cover member 40, and the fasteners 36 (see FIG. 3 for an exploded view of the securing arrangement 15) are not destroyed, being made of metal. Therefore, the cover member 40 is held on the support member 12 by the fasteners 36.

One of the end portions 17 is pressed downwardly by the load, thereby causing one end of the first slot 20 in the support member 114 and the opposite end of the third slot 44 in the cover member 40 to engage the suspension member 14. This engagement of the ends of the first and third slots 20, 44 prevents the support member 12 from falling.

The latch member 30 is formed of a metal material, and can also contribute to the support provided to the loads on the support member 12 in the event of a fire.

The suspension assembly 10 further includes a locking arrangement 76 to lock the latch member 30 in the securing position. The locking arrangement 76 comprises a locking member 78.

Figure 12:
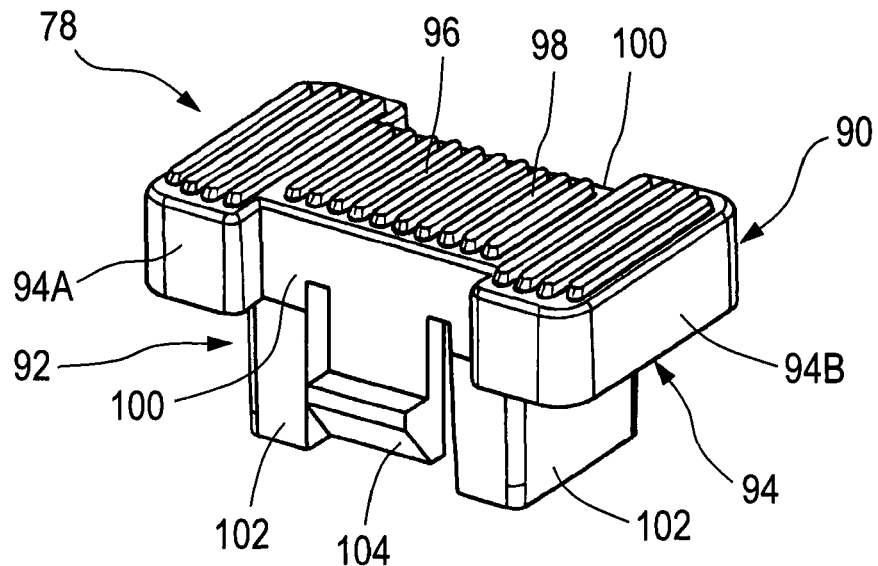
FIG. 12 is a perspective view of a locking member.
Figure 13:
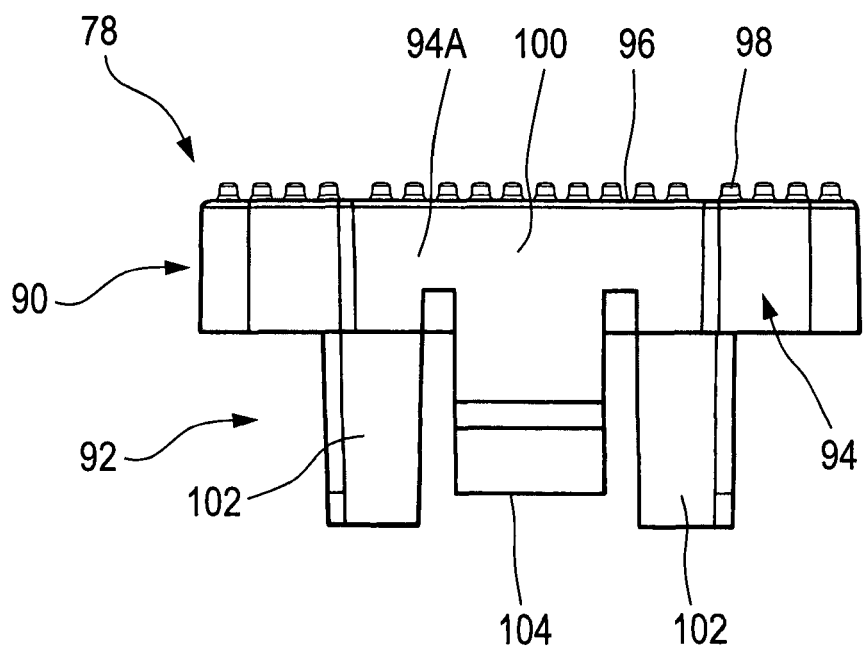
FIG. 13 is a side view of the locking member.
Figure 14:
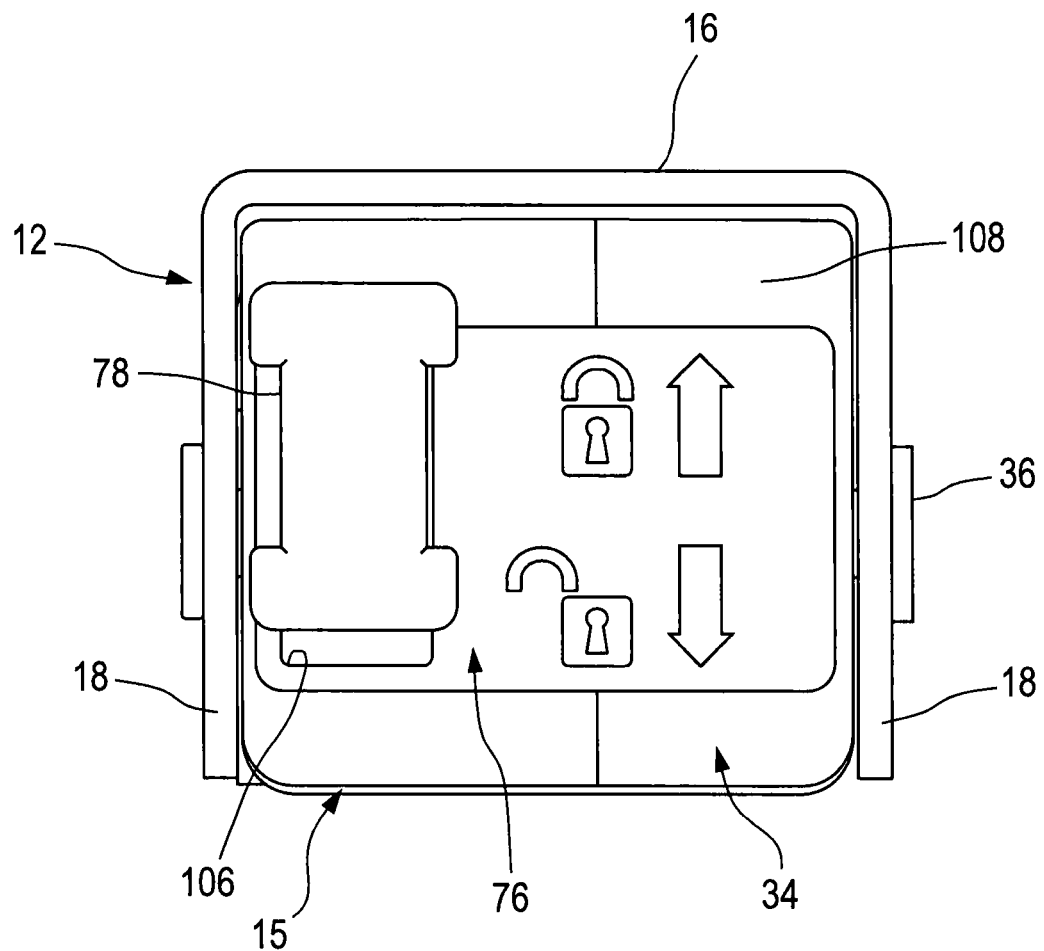
FIG. 14 shows the locking arrangement on the securing arrangement.
Figure 15:
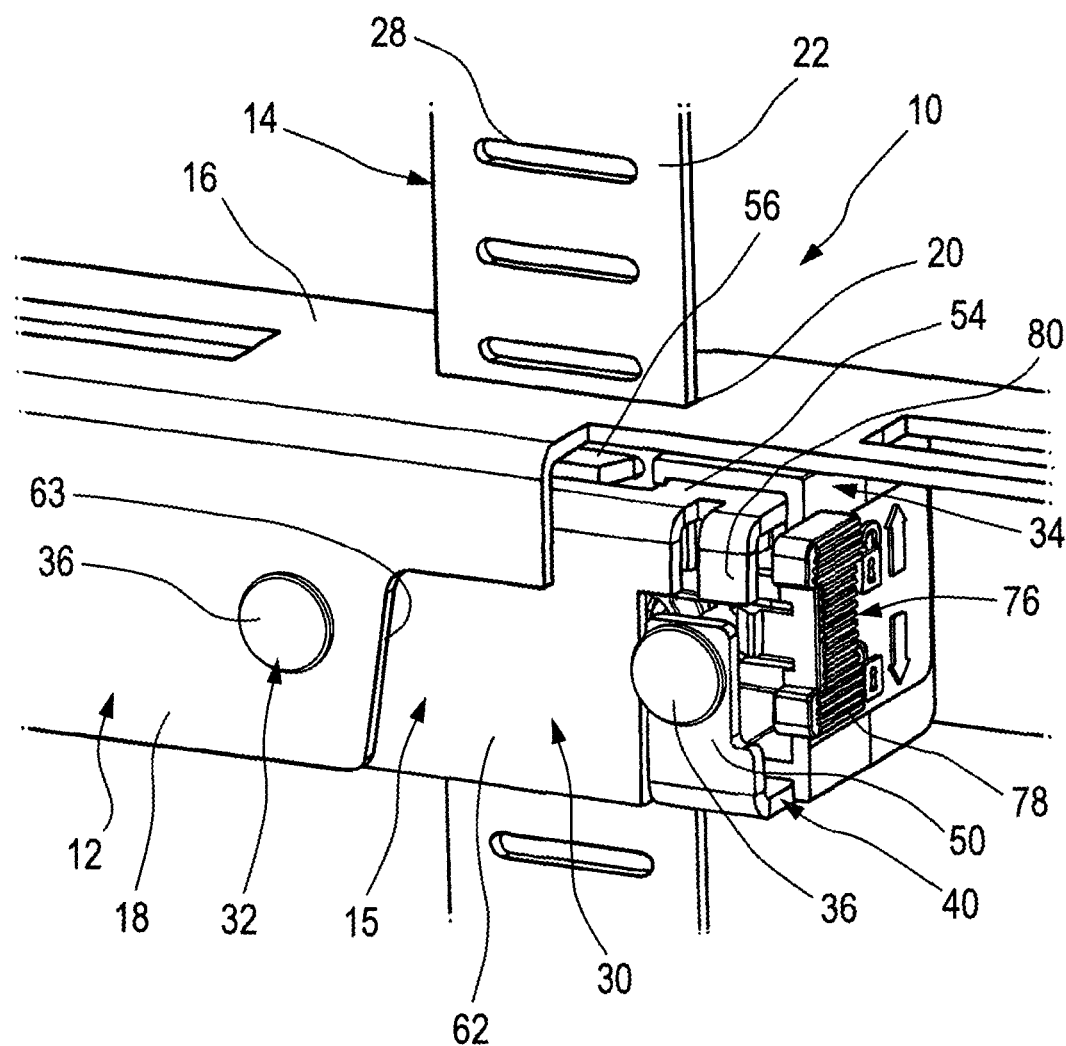
FIG. 15 is a close-up cut out perspective view of the suspension assembly showing a locking arrangement in a locked position.
Figure 16:
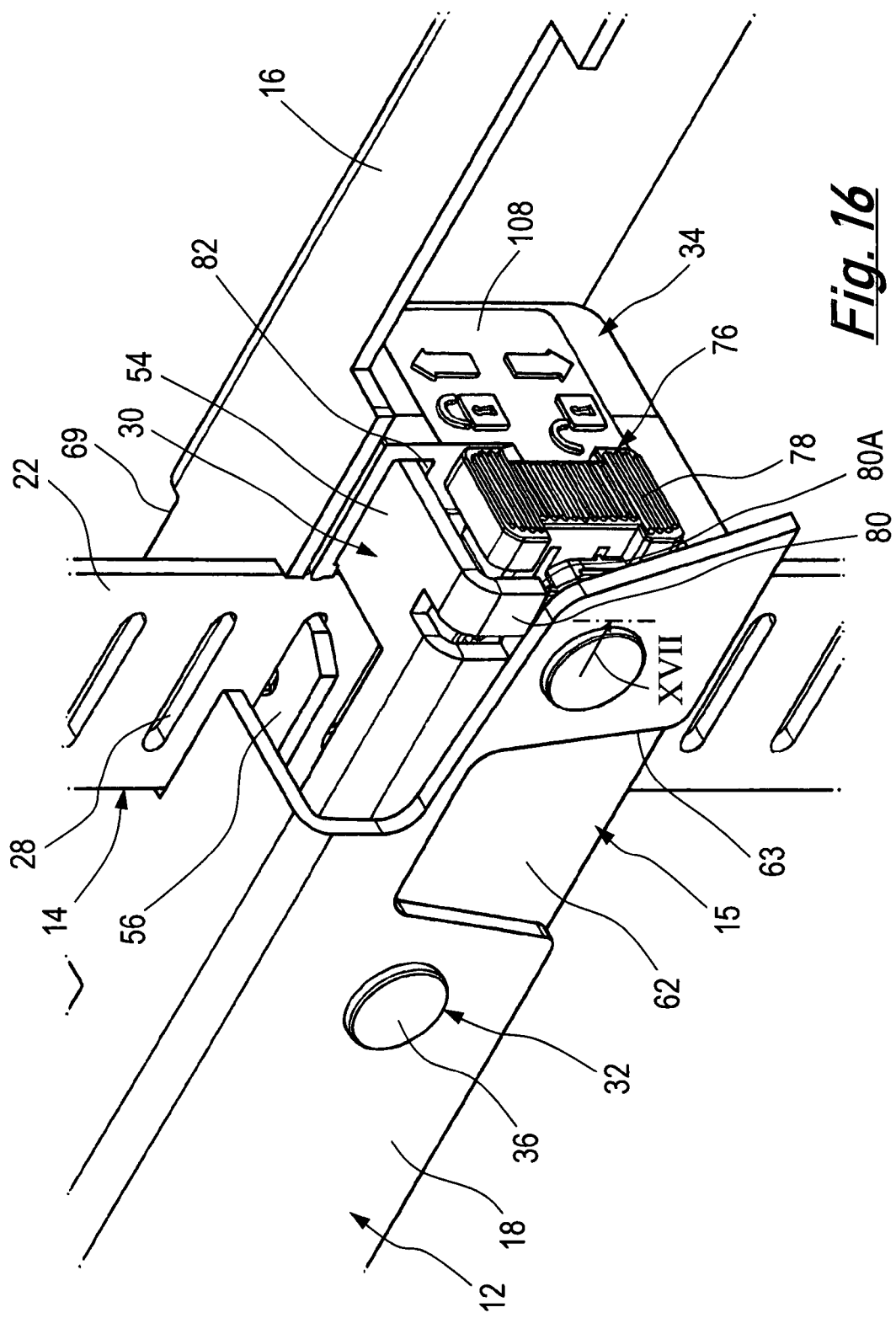
FIG. 16 is a further close-up cut out perspective view of the suspension assembly showing the locking arrangement in a locked position.

FIGS. 12 and 13 show the locking member 78. The locking member 78 comprises an outer portion 90 and a positioning portion 92.

The outer portion 90 has a plurality of side members in the form of side walls 94. Specifically, the locking member shown in the drawings has four of the side walls 94. The side walls comprise two opposite longer side walls 94A and two opposite shorter side walls 94B. The shorter side walls 94B extend between the opposite longer side walls 94A.

The outer portion 90 also has a transverse portion 96 having ribs 98. The transverse portion 96 extends between the walls 94. The transverse portion 96 is substantially flat, to help prevent the locking member 78 deforming under an external load on the transverse portion 96, such as a packing/delivery load or caused by being dropped.

Each of the opposite longer side walls 94B has a recessed middle portion 100. The positioning portion 92 has a pair of opposed positioning members 102 extending between the opposite recessed middle portions 100.

A respective detent member 104 extends from each of the recessed portions 100 between the positioning members 102. When the locking member 78, is mounted on the support member 12, the positioning members 102 are received in an aperture 106 defined in an end member 108 of the holding member 34.

The positioning members 102 position the locking member 78 over the aperture 106 and the detent members 104 hook over opposite edges of the aperture 106. Thus, the detent members 104 secure the locking member 78 to the support 12.

Figure 17:
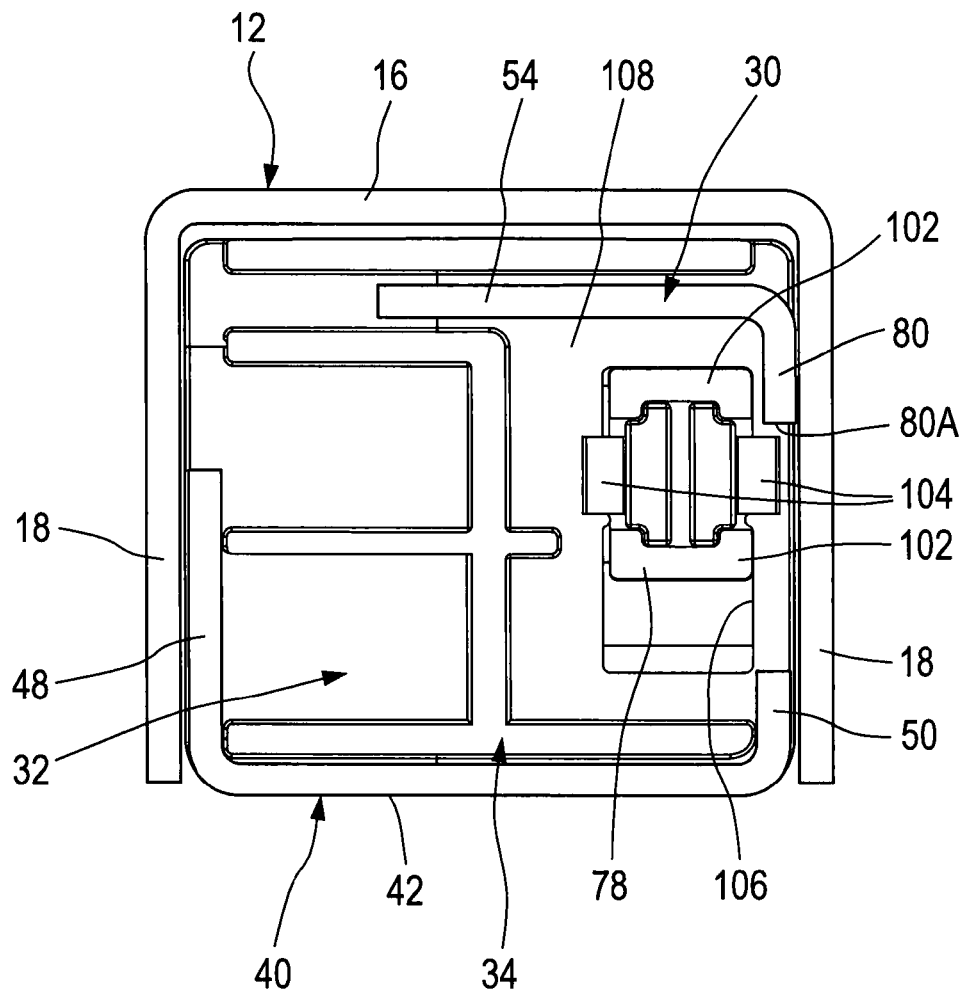
FIG. 17 is a sectional view in the direction of the arrow XVII of the suspension assembly shown in FIG. 16.
Figure 18:
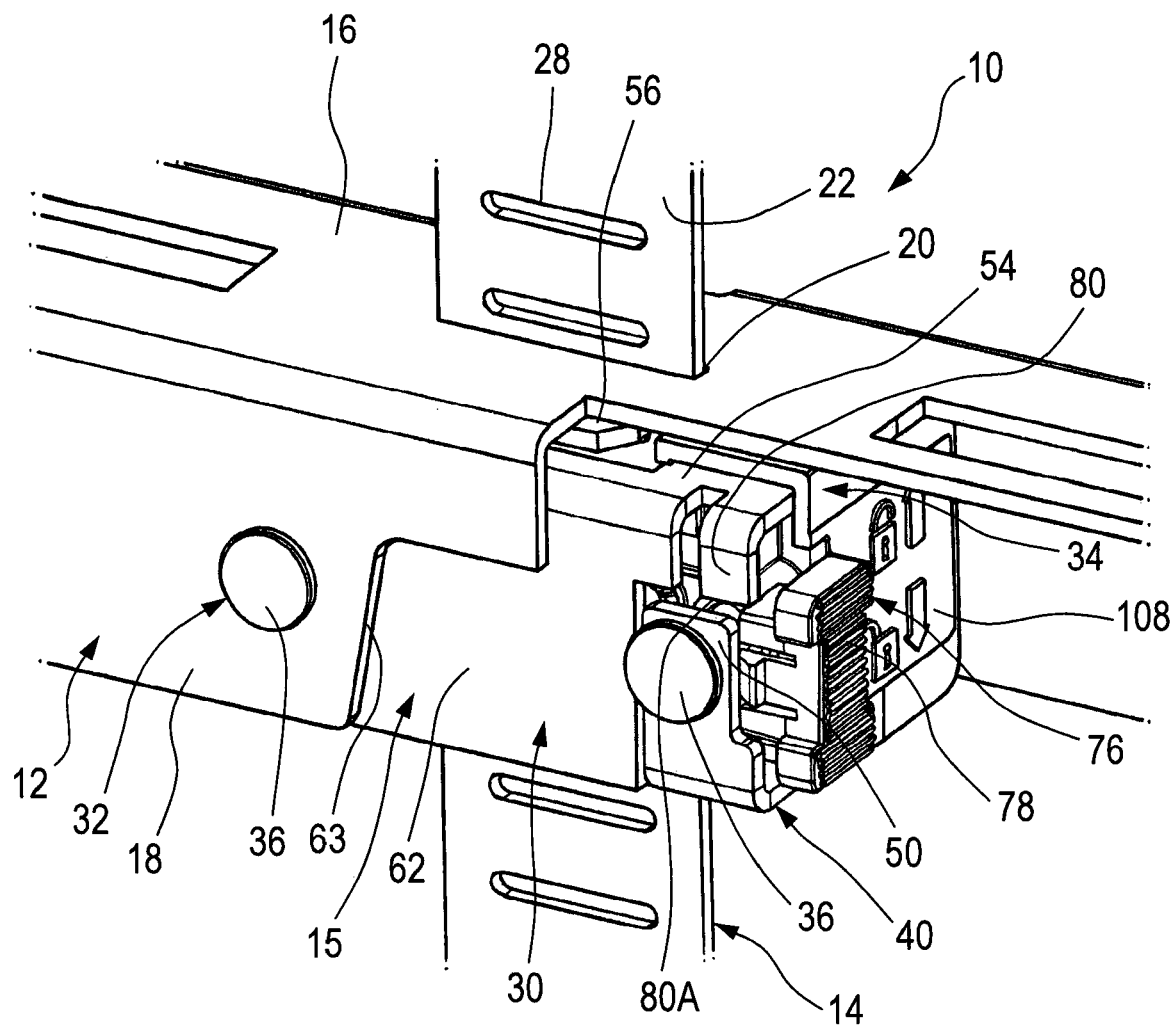
FIG. 18 is a close-up cut out perspective view of the suspension assembly showing a locking arrangement in an unlocked position.
Figure 19:
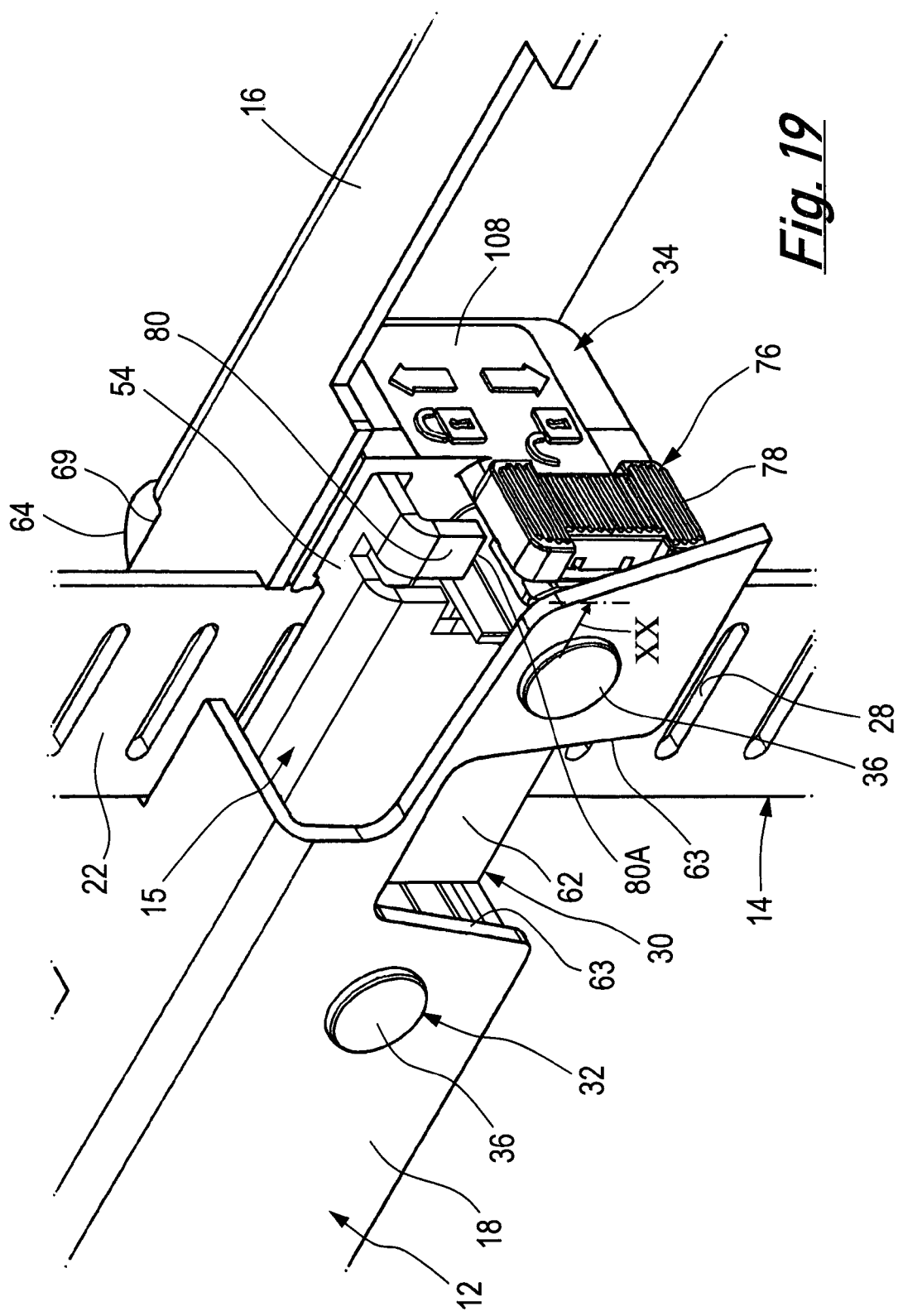
FIG. 19 is a further close-up cut out perspective view of the suspension assembly showing the locking arrangement in an unlocked position.
Figure 20:
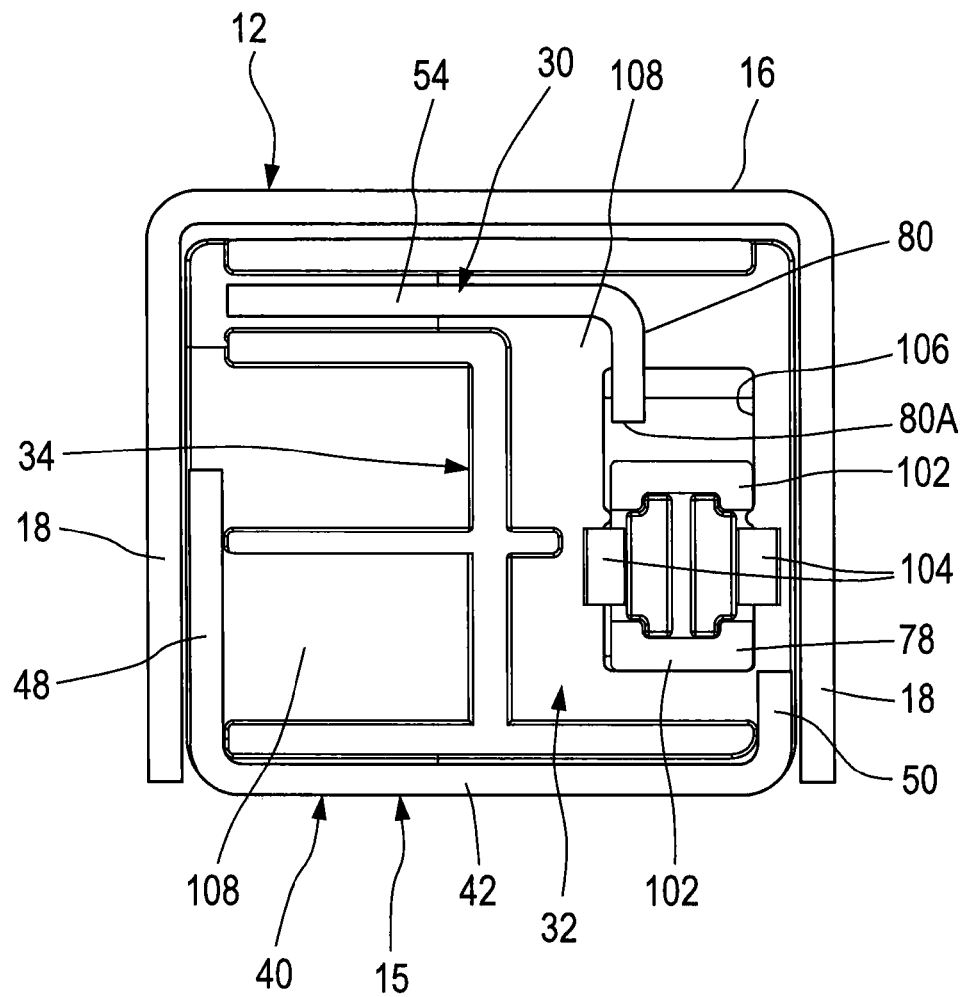
FIG. 20 is a sectional view in the direction of the arrow XX of the suspension assembly shown in FIG. 19.
Figure 21:
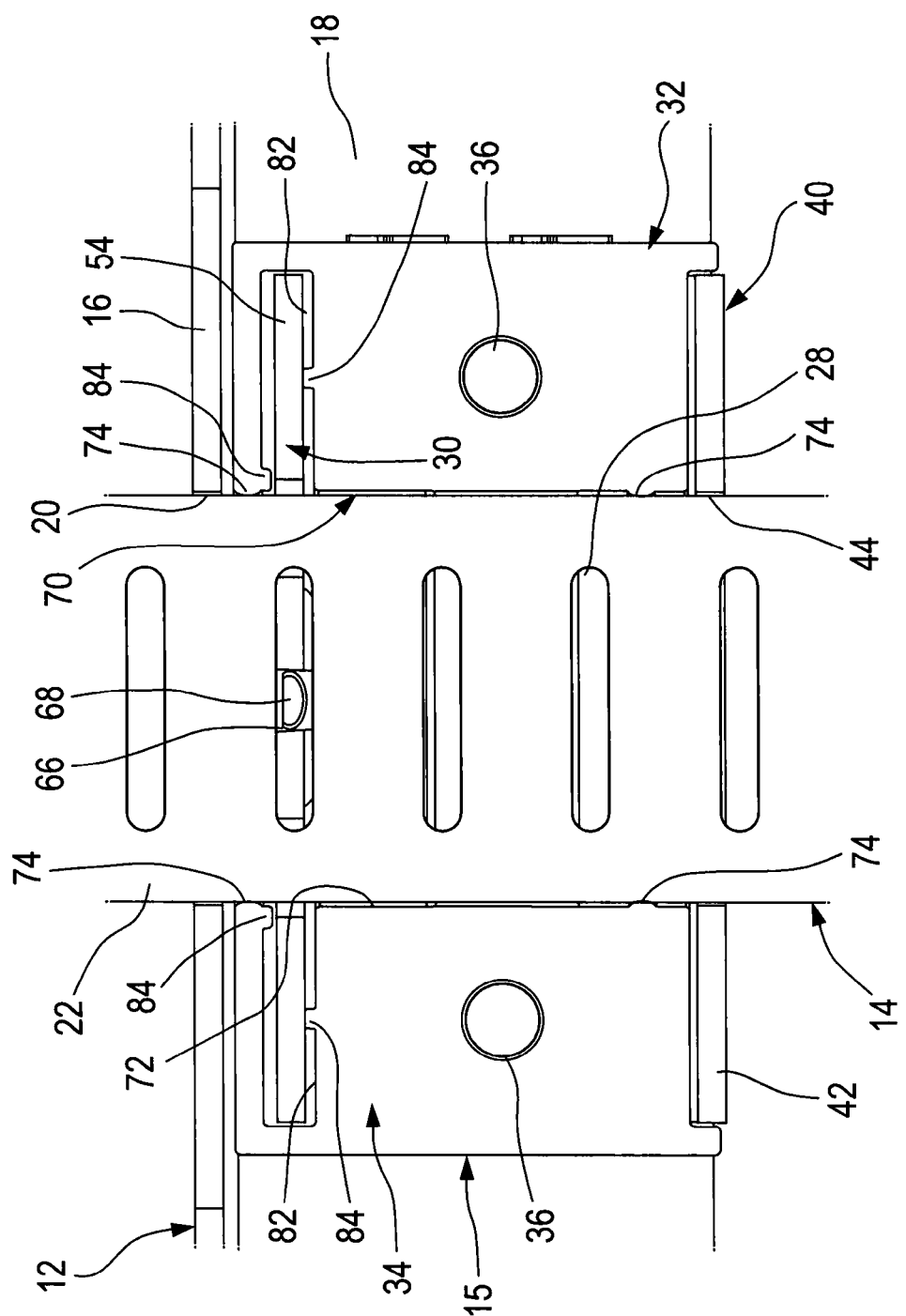
FIG. 21 is a sectional side view showing the suspension member in the securing arrangement.

The locking member 78 movable between a locked position, shown in FIGS. 14, 15, 16 and 17, and an unlocked position shown in FIGS. 18, 19 and 20.

The latch member 30 includes a co-operating portion 80 adjacent the release portion 62. The co-operating portion 80 has an end 80A, and is in the form of a lug.

As shown in FIG. 17, the co-operating portion 80 is arranged in line with the positioning portion 92 of the locking member 78 when the latch member 30 is in the securing position and the locking member 78 is in the locked position. In this position, the latch member 30 is locked in the securing position.

The co-operating portion 80 engages the positioning portion 92 when an attempt is made to move the latch member 30 from the securing position to the non-securing position, thereby preventing the movement of the latch member 30 to the non-securing position.

When the locking member 78 is moved to the unlocked position shown in FIGS. 18, 19 and 20, the positioning portion 92 is moved out of alignment with the co-operating portion 80, thereby allowing the latch member 30 to be moved to the non-securing position.

When the latch member 30 is disposed in the non-securing position, the end 80A of the co-operating portion 80 is disposed over the locking member 78, as shown in FIG. 20. The end 80A of the co-operating portion 80 prevents the locking member 78 from being moved to its locked position. This provides the advantage in the embodiment described that the locking member 78 is prevented from locking the latch member 30 in the non-securing position. Thus, if an attempt is made to move the locking member 78 towards the locked position, the locking member 78 engages the end 80A and is prevented from moving to its locked position.

The holding component 34 further defines a constraining formation to constrain movement of the latch member 30. The constraining formation is in the form of a constraining slot 82 through which the carrying portion 54 extends.

The holding component 34 further includes constraining ribs 84 that engage the carrying portion 54 to ensure that the insertion portion 56 runs accurately through the holding component 34 so that it can be received in the selected second slot 28 at a right angle to the main part 22 of the suspension member 14.

There is thus described a suspension assembly 10 that includes a single suspension member 14 that is attached to a single securing arrangement 15. This provides the advantage in the embodiment described herein of faster installation time, reduced number of fixing components, fewer components on site, and smaller product size.

The provision of the crush ribs 74, which are engaged by the main part 22 of the suspension member 14, ensure stability of the support member 12 on the suspension member 14.

In addition, the provision of two of the urging members 60 help to stabilise the movement of the latch member 30 through the holding component 34.

Various modifications can be made without departing from the scope of the invention. Although only the support member 12 is shown in a single size, the support member 12 may have any desired suitable length.

The central aperture in the form of the first slot 20 and the single suspension member 14 provides the benefit that it allows side loading installation of electrical cables on an electrical containment bracketry system. This is advantageous over prior art suspension systems having a suspension member at each end of the support member. The prior art system, therefore, requires the cables to be pulled through the system between the suspension members. For example, the installation time using the above embodiment is less than prior art systems.

There is thus described a suspension assembly 10 that allows pipes and other articles to be side loaded onto the support member 12, so that the support members 12 provide cantilevered support to the articles.

In addition, the suspension assembly 10 provides protection in the event of a fire. In such a situation, the plastic components will be burnt or melted away, but the metal components will remain and provide continued support for the articles.

Figure 23:
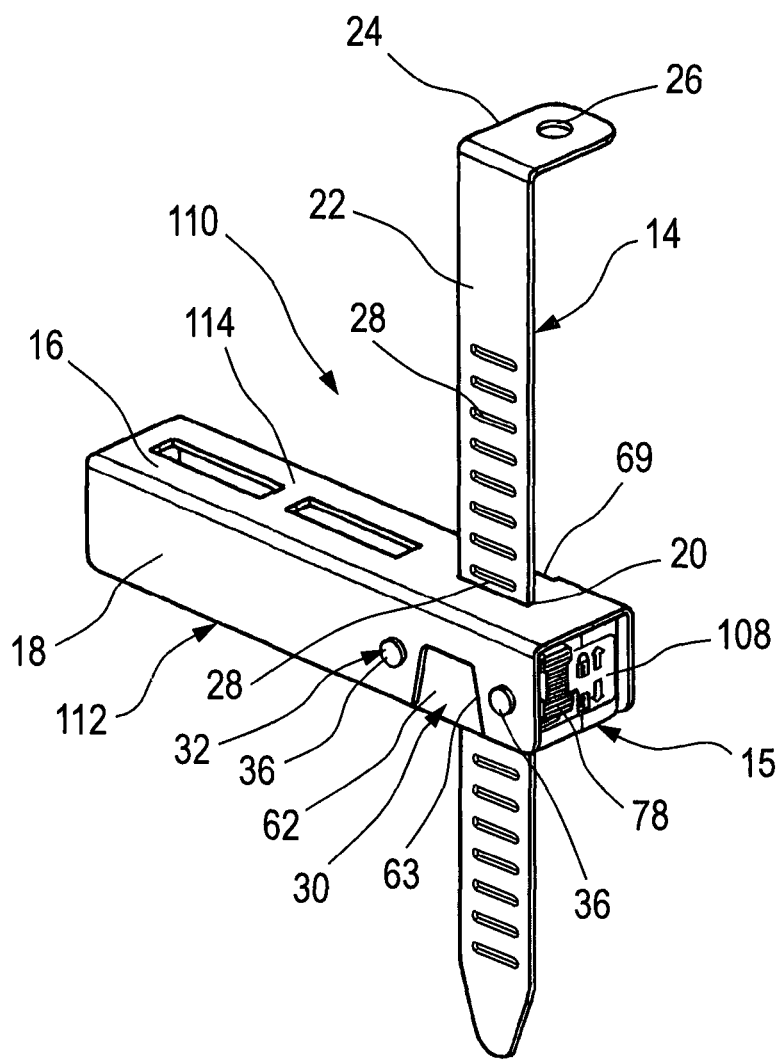
FIG. 23 is a front perspective view from above of another suspension assembly.

FIG. 23 shows another suspension assembly, generally designated 110. The suspension assembly 110 comprises a support member 112. The support member 112 is similar to the support member 12 shown in FIGS. 1 to 22, and includes many of the same features as the support member 12. The features of the support member 112 that are the same as the features of the support member 12 are designated with the same reference numerals.

The support member 112 differs from the support member 12 in that the first slot 20 is defined at one end of the upper portion 16. As can be seen from FIG. 12, the first slot 20 is closer to one end of the support member 112 than the other end. A cantilever support portion 114 extends from the first slot 20.

The elongate suspension member 14 extends through the first slot 20. The cantilever support portion 114 is the same as one of the end regions 17 of the support member 12.

The suspension assembly 110 also includes a securing arrangement 15 in the support member 112. The securing arrangement 15 is identical to the securing arrangement 15 shown in FIGS. 1 to 22. The features of the securing arrangement 15 shown in FIG. 23 are the same as the features of the securing arrangement 15 shown in FIGS. 1 to 22, and are designated with the same reference numerals.

When a load is disposed on the cantilever support portion 114, the cantilever support portion 114 is pressed downwardly, thereby causing the opposite edges of the suspension member 14 to engage with ends of the first slot 20 and with the ends of the second slot 44.

Thus, in the event of a fire, the plastic components may be destroyed. However, the suspension member 14, the support member 112, the cover member 40, and the fasteners 36 (see FIG. 3 for an exploded view of the securing arrangement 15) are made of metal. Therefore, these components are not destroyed, and the cover member 40 is held on the support member 112 by the fasteners 36.

The weight of the load on the cantilever support portion 114 presses downwardly on the cantilever support portion 114, thereby causing one end of the first slot 20 in the support member 114 and the opposite end of the third slot 44 in the cover member 40 to engage the suspension member 14. This engagement of the ends of the first and third slots 20, 44 prevents the support member 112 from falling.

The invention claimed is:

1. A suspension assembly comprising:
an elongate suspension member defining a latching opening;
a support member defining an aperture for receiving the suspension member therethrough; and
a securing arrangement including a latch member receivable through the latching opening in the suspension member to secure the support member to the suspension member;
the securing arrangement further including a mounting assembly for mounting the securing arrangement on the support member;
the mounting assembly comprising a holding component for holding the latch member, wherein the latch member is held inside the holding component.

2. A suspension assembly according to claim 1, wherein the support member has an elongate upper portion, and the central aperture is defined in said upper portion, and wherein the support member has an elongate side portion extending from the upper portion, the side portion extending lengthwise along the upper portion.

3. A suspension assembly according to claim 1, wherein the latch member is movable between securing and non-securing positions, whereby in the securing position of the latch member, the suspension member is secured to the support member, and the latch member engages the suspension member.

4. A suspension assembly according to claim 1, wherein the latch member comprises a carrying portion and an insertion portion on the carrying portion, the insertion portion being insertable through the opening in the suspension member to secure the suspension member to the support member.

5. A suspension assembly according to claim 4, wherein when the latch member is in a securing position, the insertion portion is received by the opening in the suspension member, and wherein when the latch member is in a non-securing position, the suspension member is movable relative to the support member, and in said non-securing position, the latch member is disengaged from the suspension member.

6. A suspension assembly according to claim 3, wherein the carrying portion defines an opening into which the insertion portion extends, whereby when the latch member is in the non-securing position, the opening is aligned with the aperture defined by the support member.

7. A suspension assembly according to claim 3, wherein the latch member has a guide formation to receive a corresponding guide member to thereby guide movement of the latch member.

8. A suspension assembly according to claim 6, wherein the guide formation extends into the insertion portion, and the latch member includes a projecting portion on the carrying portion, wherein the projecting portion projects from the carrying portion opposite the insertion portion, and the guide formation extending from the carrying portion into the projecting portion.

9. A suspension assembly according to claim 1, wherein the securing arrangement comprises a resilient urging member engaging the latch member, the resilient urging member being provided to urge the latch member to a securing position.

10. A suspension assembly comprising:
an elongate suspension member defining a latching opening;
a support member defining an aperture for receiving the suspension member therethrough; and
a securing arrangement including a latch member receivable through the latching opening in the suspension member to secure the support member to the suspension member;

wherein the securing arrangement includes a mounting assembly for mounting the securing arrangement on the support member, the mounting assembly comprising a holding component for holding the latch member, and wherein the holding component comprises a gripping formation for gripping the suspension member, the gripping formation defining a through passage aligned with the central aperture in the support member.

11. A suspension assembly according to claim 10, wherein the gripping formation includes ribs to engage the suspension member, whereby the ribs are crushed by the suspension member when the suspension member is received through said central aperture.

12. A suspension assembly according to claim 10, wherein the mounting assembly further includes an elongate fastener to fasten the securing arrangement to the support member, the fastener extending through the holding component and the support member to fasten the holding component to the support member.

13. A suspension assembly according to claim 12, wherein the holding component further includes a fastening formation through which the fastener extends, thereby fastening the holding component to the support.

14. A suspension assembly according to claim 12, wherein the securing arrangement further includes a cover member for covering the holding component, the cover member including a locating formation for receiving the fastener and locating the cover member over the holding component.

15. A suspension assembly according to claim 1, comprising a locking arrangement to lock the latch member in a securing position, the locking arrangement including a locking member movable between locked and unlocked positions and the latch member comprises a co-operating portion to engage the locking member when the latch member is in the securing position and the locking member is in the locked position.

16. A suspension assembly according to claim 13, wherein the locking member comprises a plurality of side members and a transverse portion extending between the side members, wherein two of the side members arranged opposite each other have a recessed middle portion, the locking member having a pair of opposed positioning members extending between the opposite recessed middle portions, and wherein a respective detent member extends from each of the recessed portions.

17. A suspension assembly according to claim 16, wherein the holding component defines a hole whereby, when the locking member is mounted on the support member, the positioning members are received in said hole, the positioning members locate the locking member over the aperture, and the detent members hook over opposite edges of the hole.

18. A suspension assembly according to claim 1, wherein the suspension member is deformable to a deformed condition in which a lower region of the suspension member extends transverse to an upper region of the suspension member.

19. A suspension assembly comprising:
an elongate suspension member defining a latching opening;
a support member defining an aperture for receiving the suspension member therethrough; and
a securing arrangement including a latch member receivable through the latching opening in the suspension member to secure the support member to the suspension member;
the securing arrangement further including a mounting assembly for mounting the securing arrangement on the support member;
the mounting assembly comprising a holding component for holding the latch member, the latch member being movable relative to the holding component; and
the mounting assembly further including a fastener to fasten the securing arrangement to the support member, the fastener extending through the holding component and the support member to fasten the holding component to the support member;
wherein the holding component further includes a fastening formation through which the fastener extends, thereby fastening the holding component to the support.

* * * * *